(12) United States Patent
Park

(10) Patent No.: US 7,545,463 B2
(45) Date of Patent: Jun. 9, 2009

(54) LIQUID CRYSTAL DISPLAY DEVICE AND FABRICATING METHOD THEREOF

(75) Inventor: Seung-Ryull Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 770 days.

(21) Appl. No.: 11/168,765

(22) Filed: Jun. 29, 2005

(65) Prior Publication Data

US 2006/0001803 A1  Jan. 5, 2006

(30) Foreign Application Priority Data

Jun. 30, 2004   (KR) ...................... 10-2004-0050332

(51) Int. Cl.
*G02F 1/1335* (2006.01)
(52) U.S. Cl. ...................... 349/113; 349/147
(58) Field of Classification Search ................. 349/113, 349/147

See application file for complete search history.

(56) References Cited

U.S. PATENT DOCUMENTS 6,731,366 B1   5/2004   Goang et al.
7,133,094 B2 *  11/2006  Ogawa et al. ............... 349/114
7,274,420 B2 *  9/2007   You ........................... 349/114
2003/0117553 A1  6/2003  Yamada
2004/0183967 A1 *  9/2004  Kim et al. ................... 349/113

FOREIGN PATENT DOCUMENTS

| JP | 9-179116 A | 7/1997 |
| JP | 9-251161 A | 9/1997 |
| JP | 10-148838 A | 6/1998 |
| JP | 2000-47235 A | 2/2000 |
| JP | 2000-111957 A | 4/2000 |
| JP | 2001-66617 A | 3/2001 |
| JP | 2001-249350 A | 9/2001 |
| JP | 2003-98537 A | 4/2003 |
| JP | 2003-241210 A | 8/2003 |
| JP | 2005-346054 A | 12/2005 |

* cited by examiner

*Primary Examiner*—Richard H Kim
(74) *Attorney, Agent, or Firm*—Birch, Stewart, Kolasch & Birch, LLP

(57) ABSTRACT

A liquid crystal display structure is provided. The liquid crystal display structure includes a gate line and a data line crossing each other on a substrate to define a pixel region, a thin film transistor connected to the gate line and the data line, a color filter pattern in the pixel region, and a pixel electrode in the pixel region. The pixel electrode is above the color filter pattern and is a stack structure including a transparent layer, an opaque layer and a low reflective layer.

51 Claims, 48 Drawing Sheets

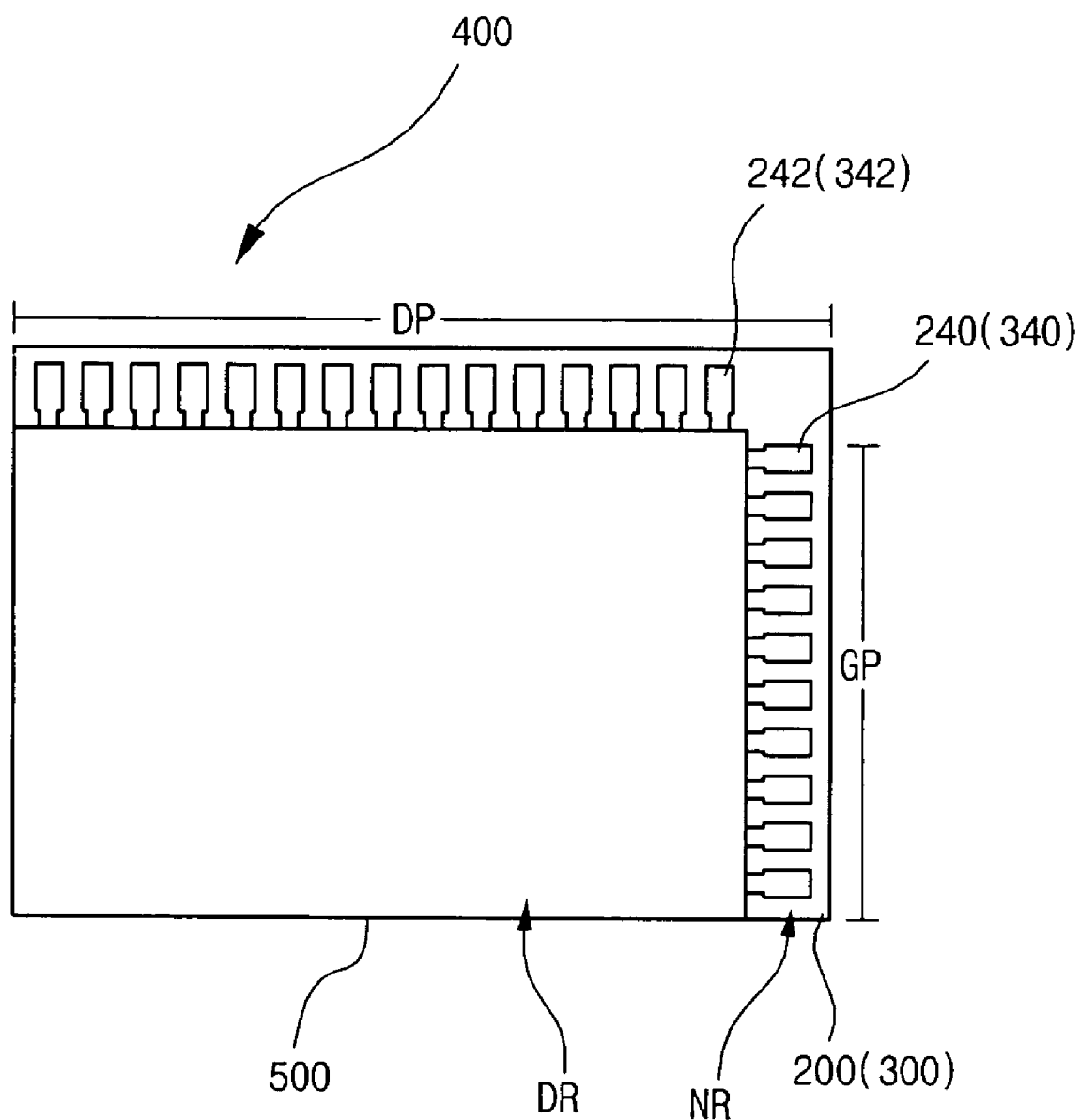

LIQUID CRYSTAL DISPLAY DEVICE AND FABRICATING METHOD THEREOF

This Nonprovisional application claims priority under 35 U.S.C. §119(a) on patent Application No. 10-2004-0050332 filed in Korea on Jun. 30, 2004, the entire contents of which are hereby incorporated by reference.

BACKGROUND OF THE INVENTION

1. Field of the Invention

The present invention relates to a liquid crystal display (LCD) device, and more particularly, to a liquid crystal display device and a fabricating method thereof.

2. Discussion of the Related Art

Until recently, display devices have typically used cathode-ray tubes (CRTs). In recent years, many efforts have been made in studying and developing various types of flat panel displays, such as liquid crystal display (LCD) devices, plasma display panels (PDPs), field emission displays (FED), and electro-luminescence displays (ELDs), as a substitute for CRTs. Of these types of flat panel displays, the LCD devices have several advantages, such as high resolution, light weight, thin profile, compact size, and low voltage power consumption.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmittance of the LCD device. Thus, the LCD device displays images by varying the intensity of the induced electric field.

FIG. 1 is a perspective view of an LCD device according to the related art. As shown in FIG. 1, the LCD device 11 includes a first substrate 22, a second substrate 5 and a liquid crystal material 14. The second substrate 5 is referred to as a color filter substrate that includes a color filter pattern 8, a black matrix 6 between the color filter patterns 8, and a common electrode 18 on both the color filter pattern 8 and the black matrix 6. The first substrate 22 is referred to as an array substrate that includes a data line 15 and a gate line 13 that cross each other to define a pixel region "P". A pixel electrode 17 and a thin film transistor "T", as a switching element, are positioned in each pixel region "P". Thin film transistors "T", which are disposed adjacent to the crossing of the data lines 15 and the gate lines 13, are disposed in a matrix form on the first substrate 22. A storage electrode 30 overlaps the gate line 13 to define a storage capacitor "C".

The first and second substrates 22 and 5 have patterns that block light. The first and second substrates 22 and 5 are aligned to each other and then attached. There is a possibility of light leakage in the LCD device due to a misalignment between the first and second substrates 22 and 5. Accordingly, an LCD device where a color filter pattern is formed on the array substrate has been used. Such an LCD device is referred to as a color filter-on-transistor (COT) type LCD device.

FIG. 2 is a cross-sectional view of a COT type LCD device according to the related art. As shown in FIG. 2, the COT type LCD device "LC" includes first and second substrates 30 and 70 attached by a sealant 60. A gate line 32 and a data line (not shown) cross each other to define a pixel region "P" on the first substrate 30. A thin film transistor "T" includes a gate electrode 33, a semiconductor pattern 38, and source and drain electrodes 40 and 42. A gate pad electrode 34 and a gate pad electrode terminal 58 are disposed at one end of the gate line 32. Color filter patterns 52a and 52b are disposed on a passivation layer 50 in each pixel region "P". A black matrix "BM" corresponds to the thin film transistor "T". A pixel electrode 56 is disposed on the color filter patterns 52a and 52b. A light shielding pattern 72 is disposed at periphery portions of the second substrate 70. A common electrode 74 is disposed on the second substrate 70 to induce a vertical electric field with the pixel electrode 56.

In the related art COT type LCD device, since the color filter patterns and the thin film transistor are formed on the same substrate, a margin of error to compensate for misalignment during attachment of the first and second substrates is not required. However, since the related art COT type LCD device uses a twisted-nematic (TN) liquid crystal material operated by the vertically induced electric field, viewing angles are limited and thus display quality is degraded.

SUMMARY OF THE INVENTION

Accordingly, the present invention is directed to a liquid crystal display device and a method of fabricating a liquid crystal display device that substantially obviates one or more of problems due to limitations and disadvantages of the related art.

An object of the present invention is to provide a liquid crystal display device that can provide a wider range of viewing angles and improve the display quality.

Another object of the present invention is to provide a method of fabricating a liquid crystal display device that can provide a wider range of viewing angles and improve the display quality.

To achieve these and other advantages and in accordance with the purpose of the present invention, as embodied and broadly described, a liquid crystal display structure includes gate and data lines crossing each other on a substrate to define a pixel region; a thin film transistor adjacent to the crossing of the gate and data lines; a color filter pattern in the pixel region; pixel electrode and a first common electrode in the pixel region, each of the pixel electrode and the first common electrode having a transparent layer, an opaque layer and a low reflective layer; gate and data pad electrodes at end portions of the gate and data lines, respectively; and gate and data pad electrode terminals on the gate and data pad electrodes, respectively, each of the gate and data pad electrode terminals having at least the transparent layer.

In another aspect, a method of fabricating a liquid crystal display structure includes forming a gate line and a gate pad electrode at end portions of the gate line on a substrate; forming a data line crossing the gate line to define a pixel region and a data pad electrode at end portions of the data line; forming a thin film transistor adjacent to the crossing of the gate and data lines; forming a color filter pattern in the pixel region; and forming a pixel electrode and a first common electrode in the pixel region, and gate and data pad electrode terminals on the gate and data pad electrodes, respectively, each of the pixel electrode and the first common electrode having a transparent layer, an opaque layer and a low reflective layer, and each of the gate and data pad electrode terminals having at least the transparent layer.

In another aspect, a method of fabricating a liquid crystal display structure includes forming a gate line and a gate pad electrode at end portions of the gate line on a first substrate; forming a data line crossing the gate line to define a pixel region and a data pad electrode at end portions of the data line;

forming a thin film transistor adjacent to the crossing of the gate and data lines; forming a color filter pattern in the pixel region; forming a pixel electrode and a first common electrode in the pixel region, and gate and data pad electrode terminals on the gate and data pad electrodes, respectively, each of the pixel electrode, the first common electrode, and the gate and data pad electrode terminals having a transparent layer, and an opaque layer and a low reflective layer on the transparent layer; attaching the first substrate and a second substrate such that the gate and data pad electrode terminals are exposed; and removing the opaque layer and the low reflective layer of each of the gate and data pad electrode terminals.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 22 is a plan view of the LCD device having the substrate fabricated according to the second and third exemplary embodiments of the present invention.

DETAILED DESCRIPTION OF THE PREFERRED EMBODIMENTS

Figure 3:
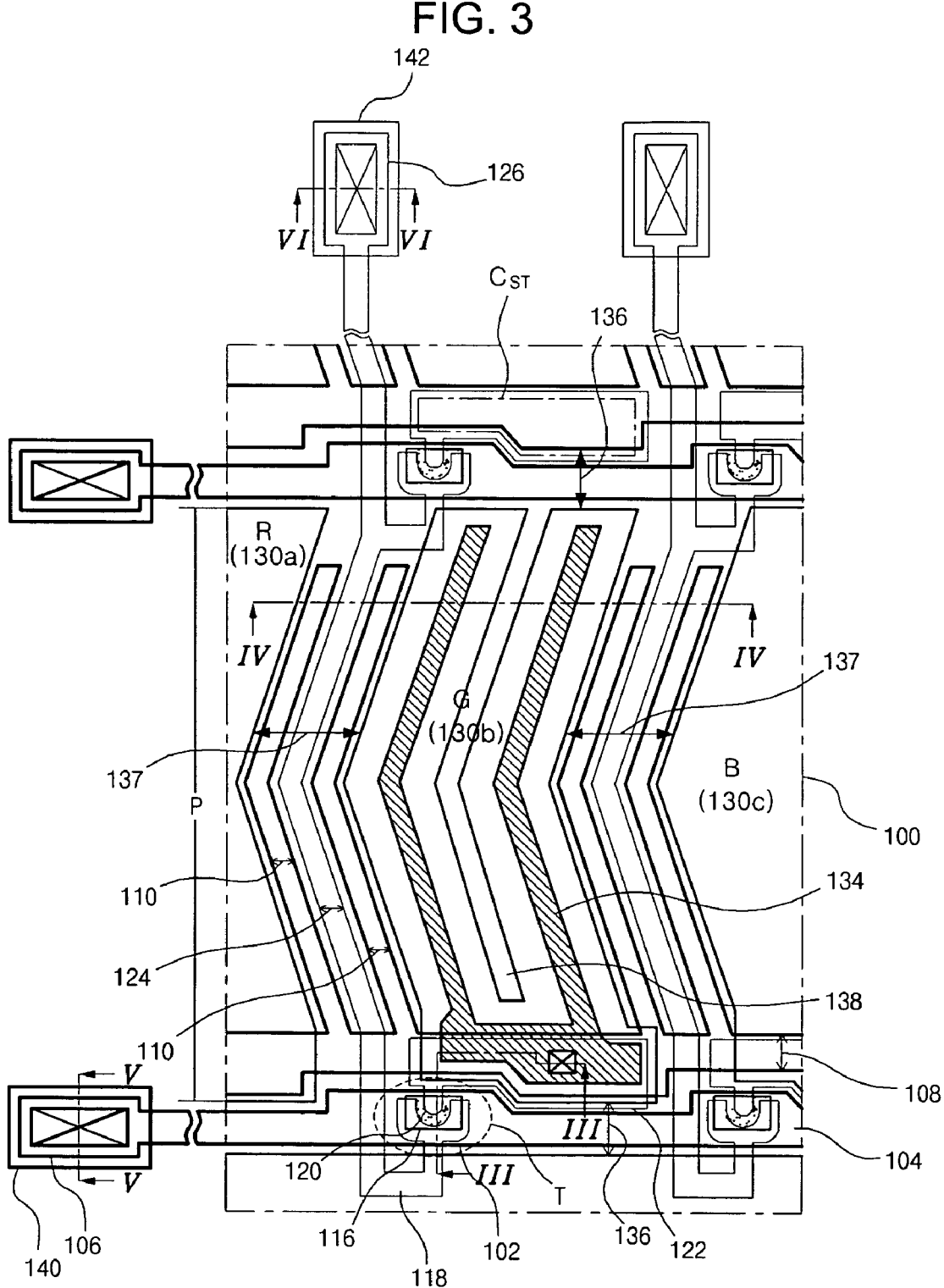
FIG. 3 is a plan view of an LCD structure according to a first exemplary embodiment of the present invention.
Figure 4A:
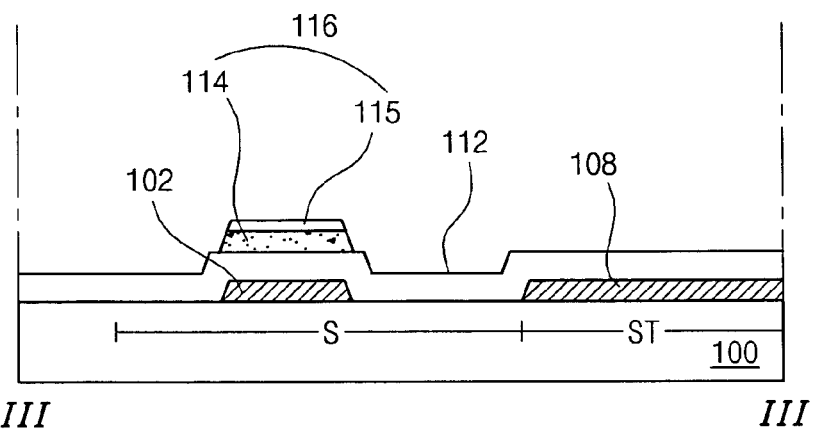
FIGS. 4A to 4D are cross-sectional views taken along lines III-III, IV-IV, V-V and VI-VI of FIG. 3, respectively, of first and second mask processes for forming an LCD device according to the first exemplary embodiment of the present invention.
Figure 4B:
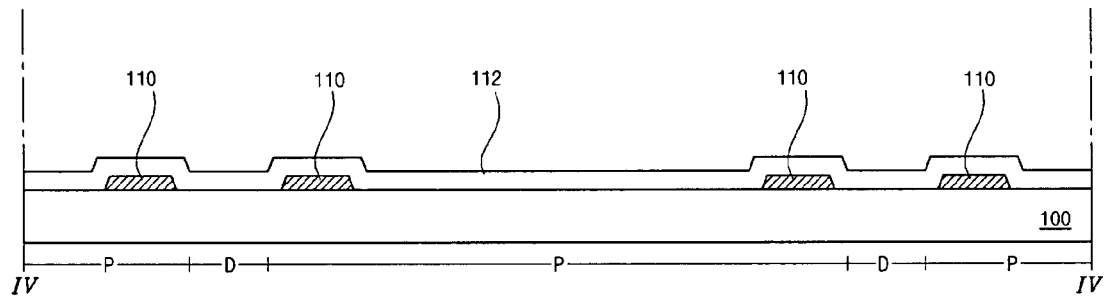
Figure 4C:
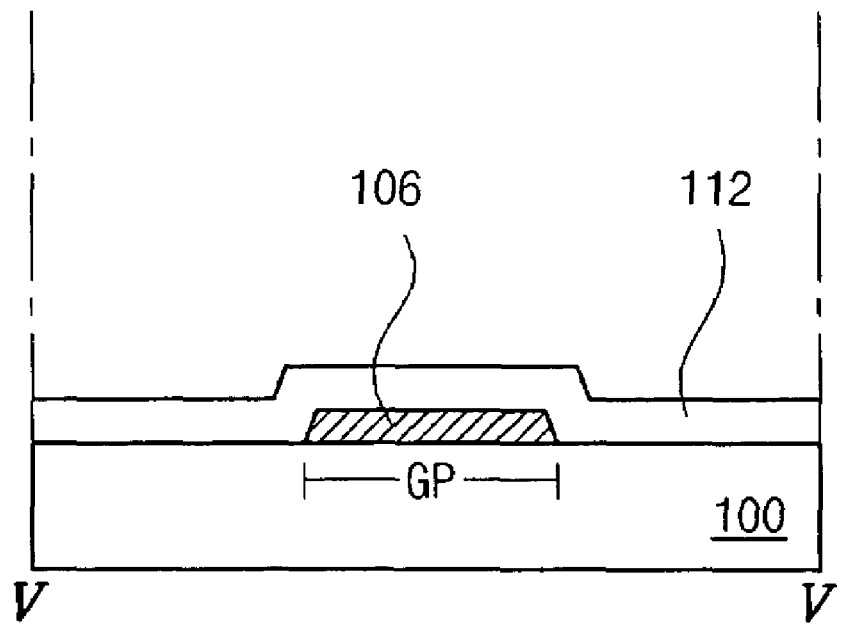
Figure 4D:
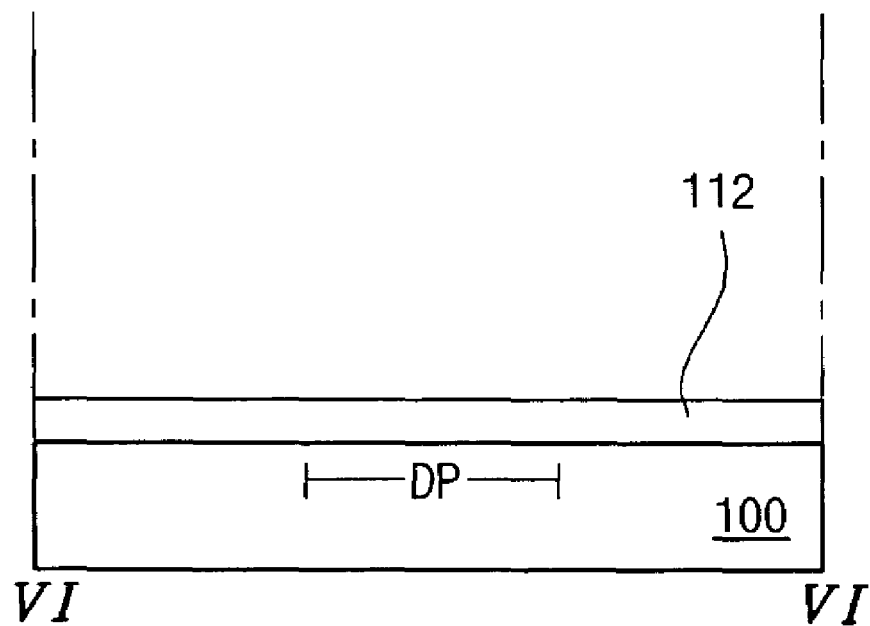
Figure 5A:
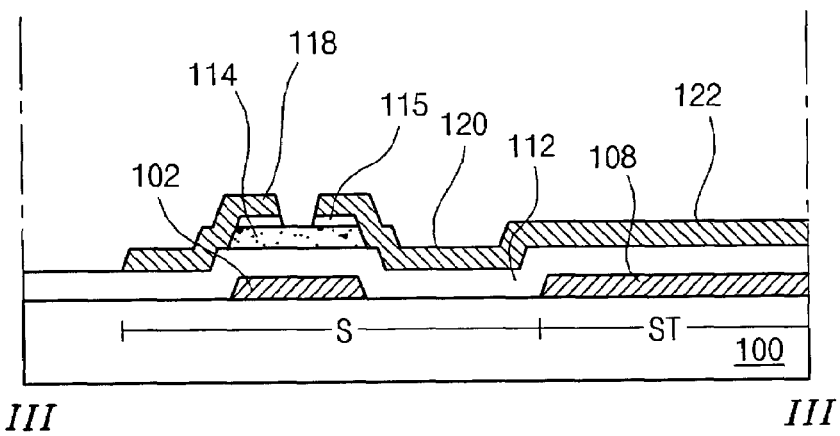
FIGS. 5A to 5D are cross-sectional views taken along lines III-III, IV-IV, V-V and VI-VI of FIG. 3, respectively, of a third mask process for forming an LCD device according to the first exemplary embodiment of the present invention.
Figure 5B:
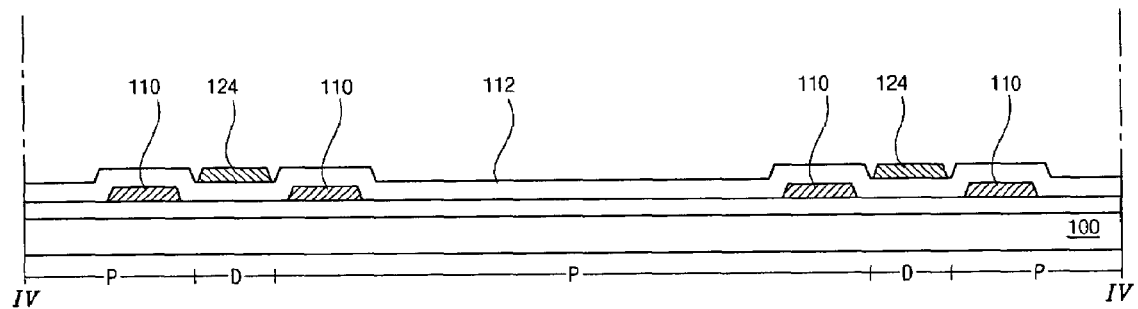
Figure 5C:
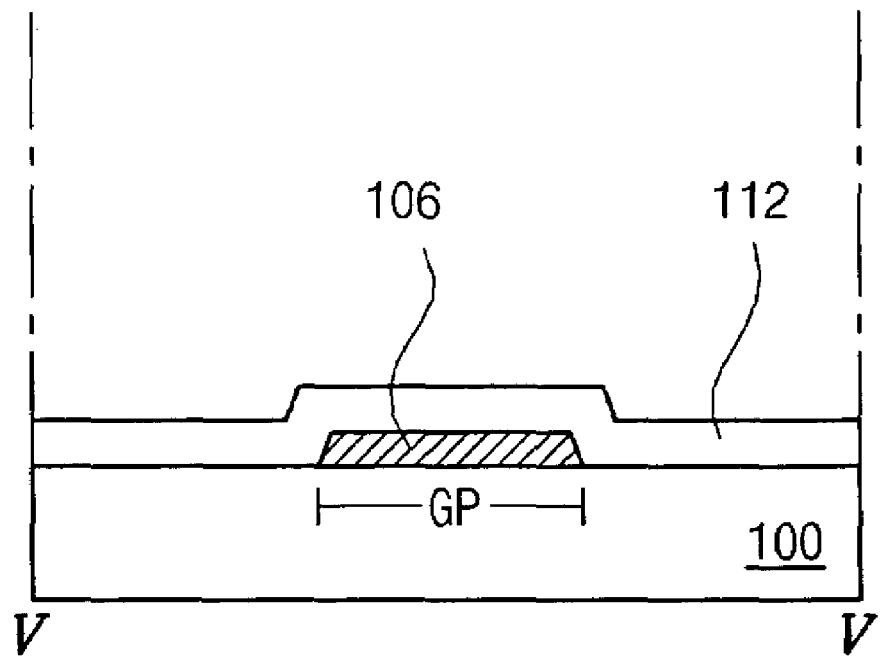
Figure 5D:
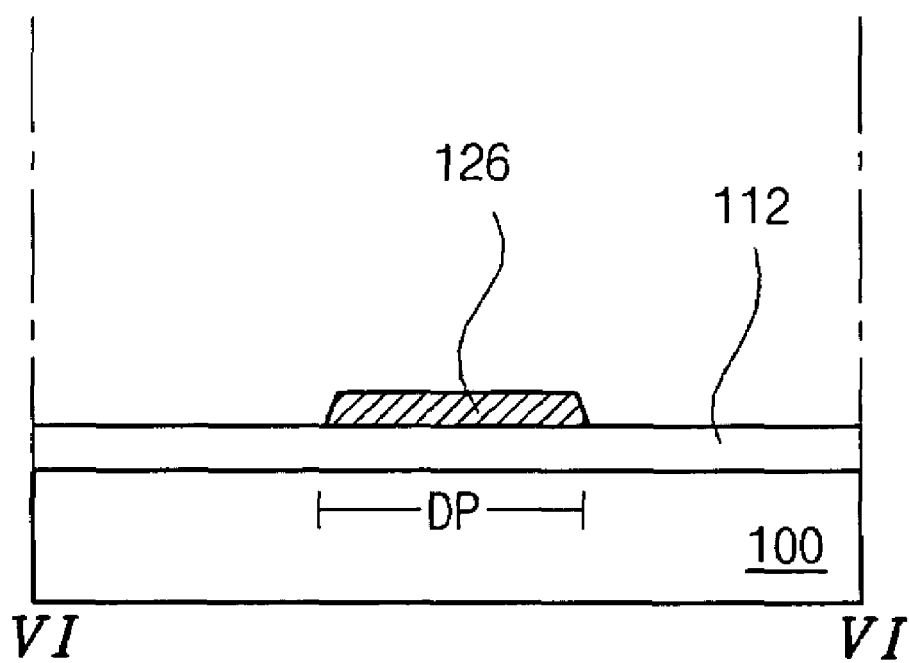
Figure 6A:
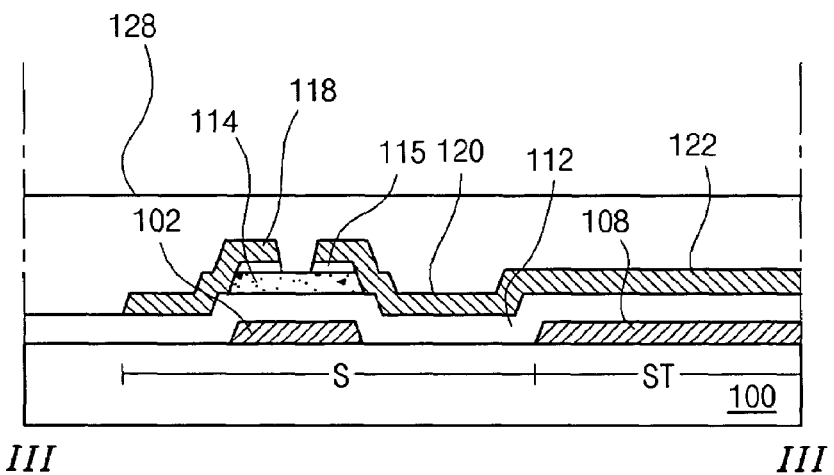
FIGS. 6A to 6D are cross-sectional views taken along lines III-III, IV-IV, V-V and VI-VI of FIG. 3, respectively, of an LCD structure having a passivation layer according to the first exemplary embodiment of the present invention.
Figure 6B:
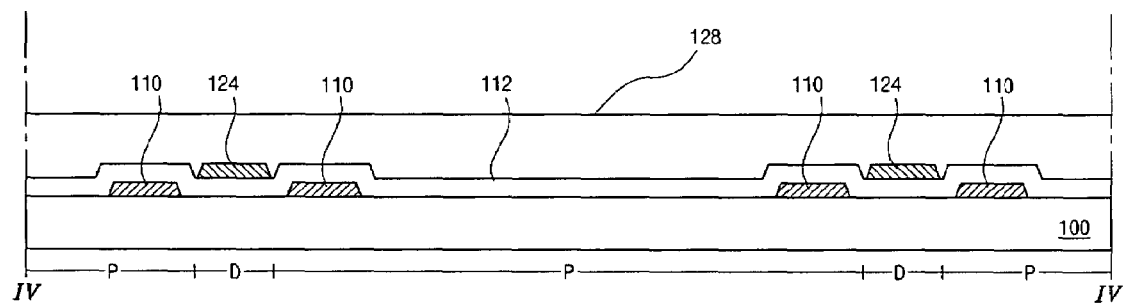
Figure 6C:
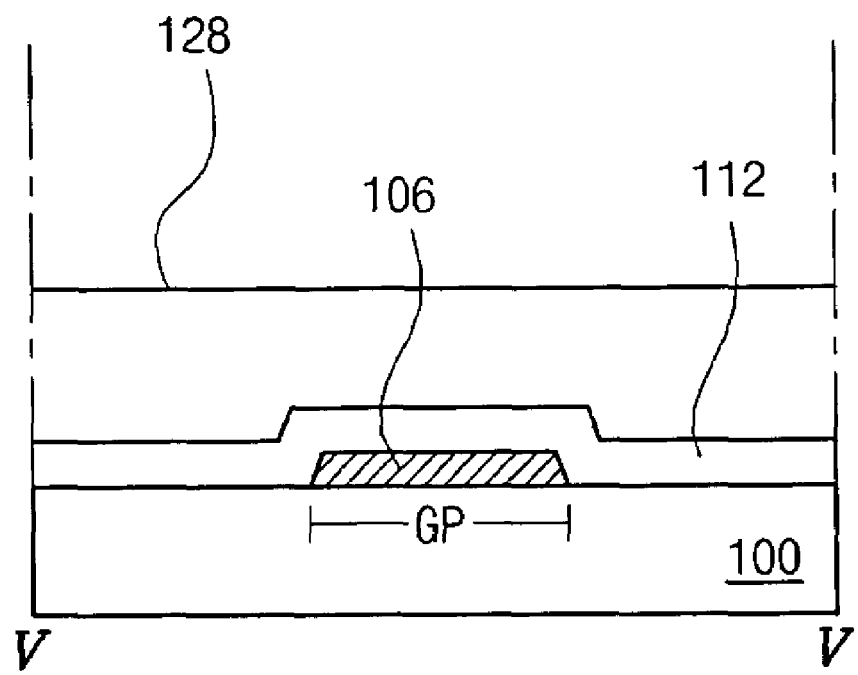
Figure 6D:
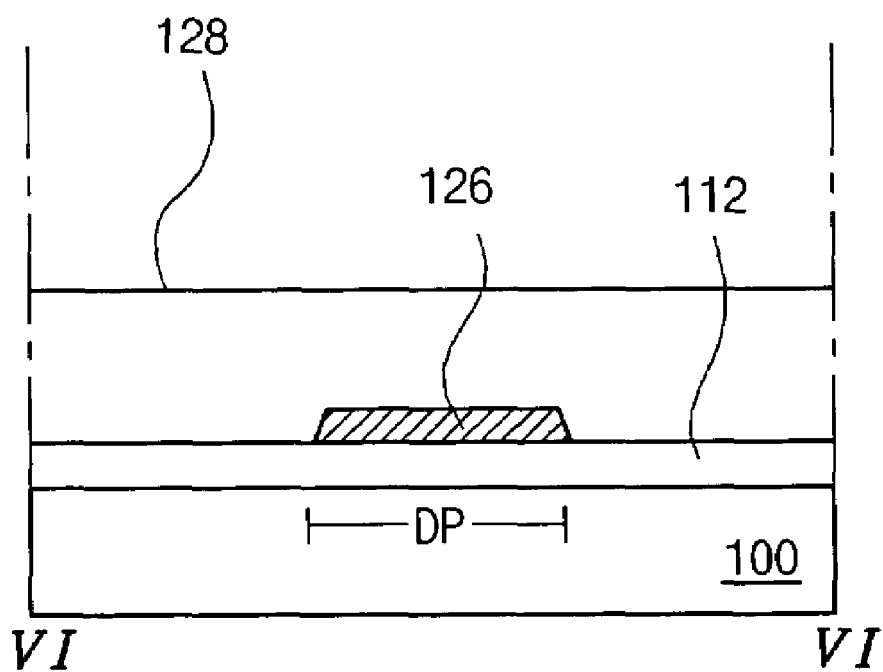
Figure 7A:
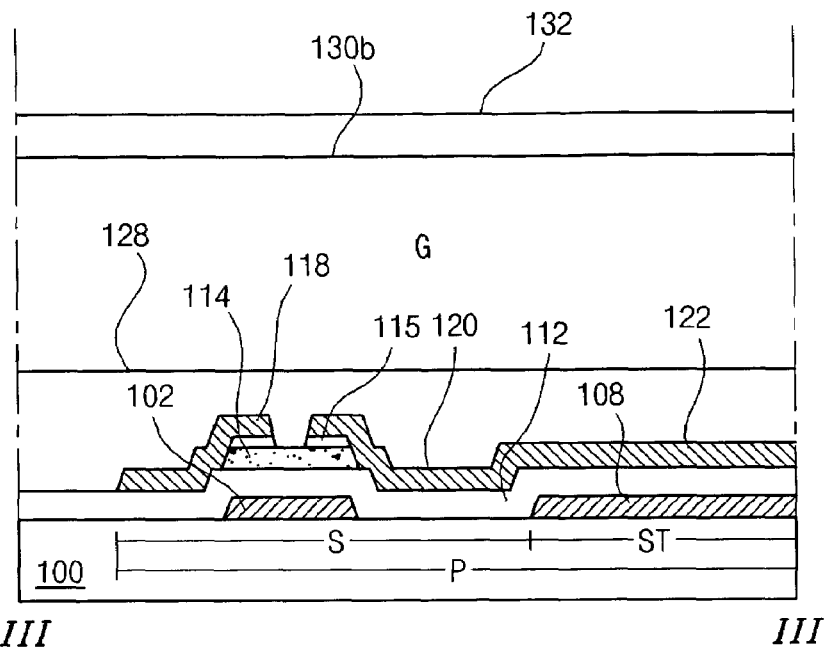
FIGS. 7A to 7D are cross-sectional views taken along lines III-III, IV-IV, V-V and VI-VI of FIG. 3, respectively, of a four mask process for forming an LCD device according to the first exemplary embodiment of the present invention.
Figure 7B:
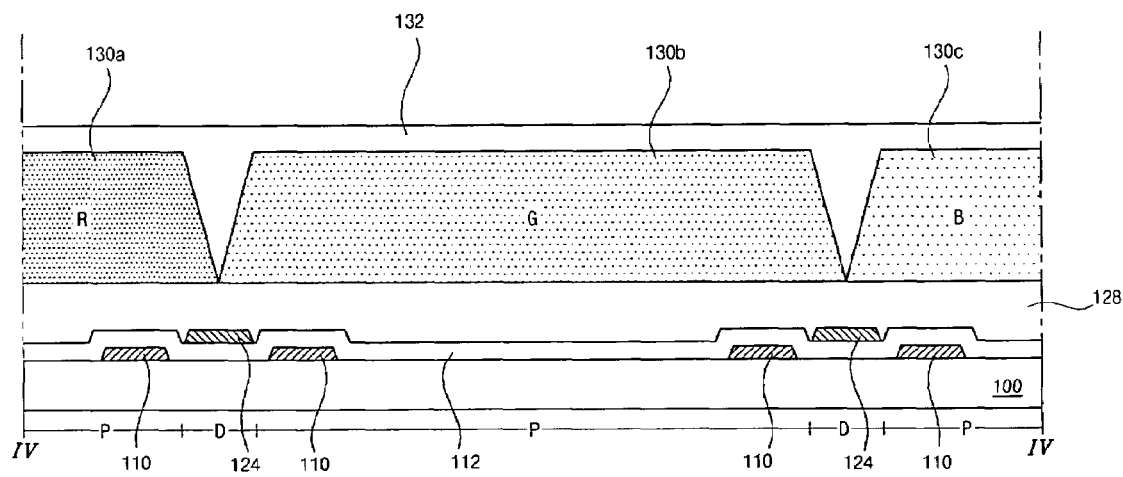
Figure 7C:
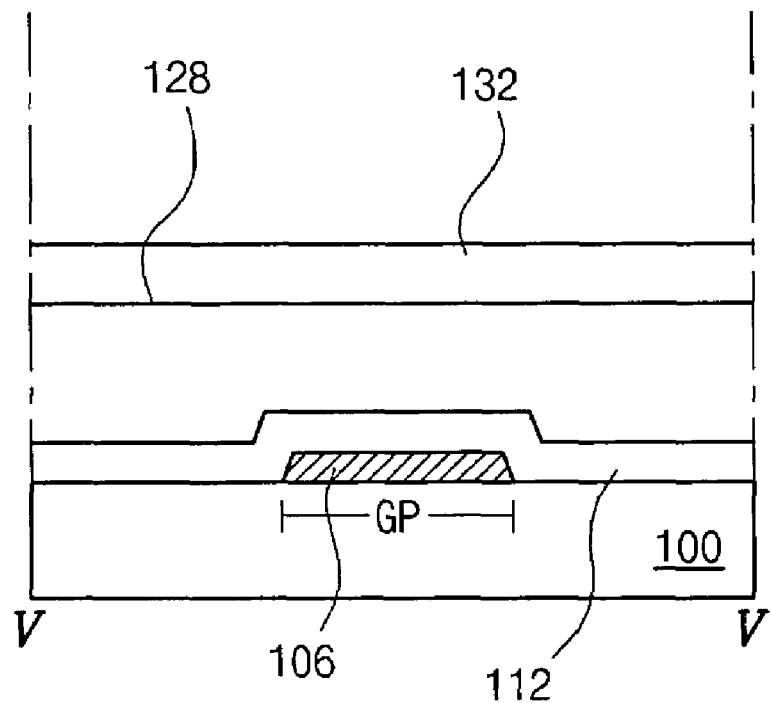
Figure 7D:
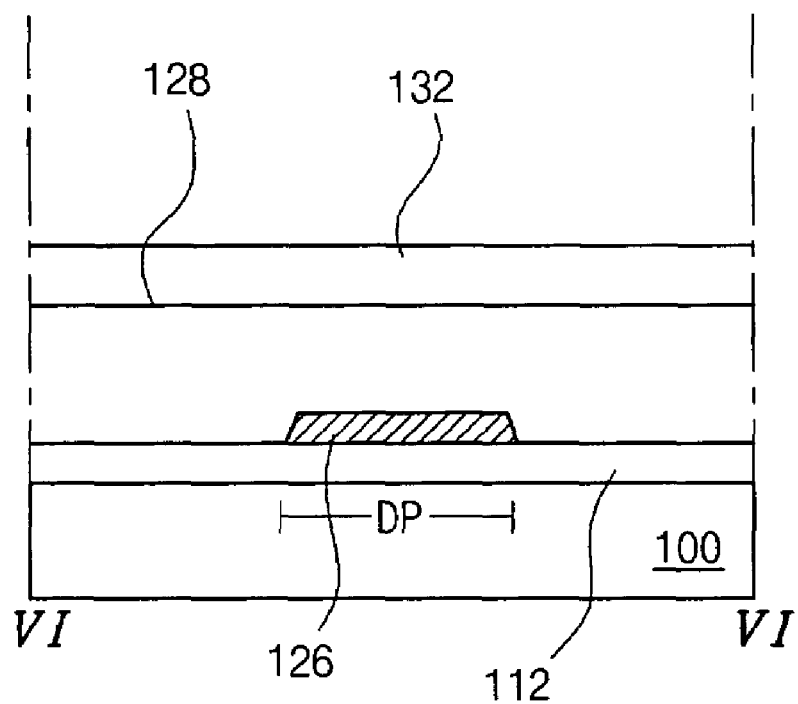
Figure 8A:
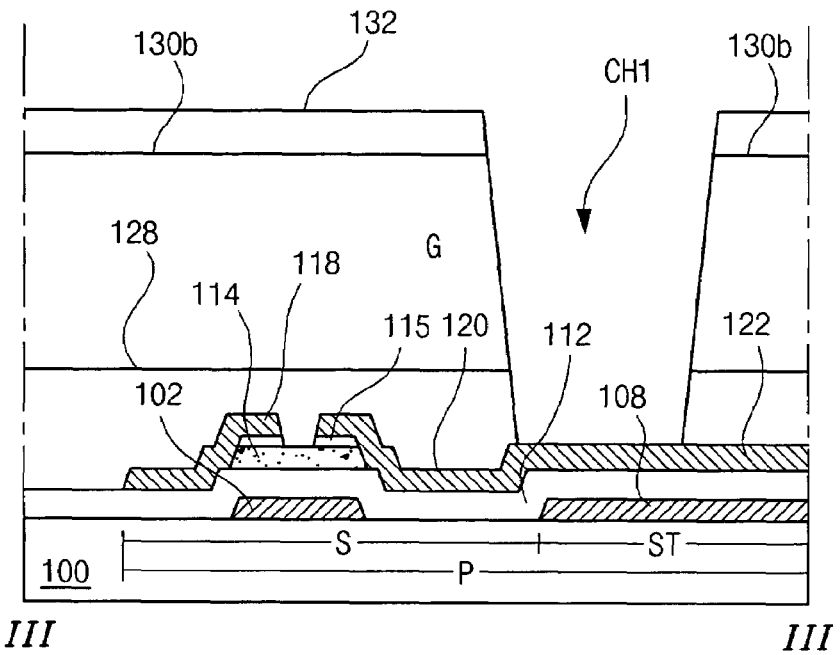
FIGS. 8A to 8D are cross-sectional views taken along lines III-III, IV-IV, V-V and VI-VI of FIG. 3, respectively, of a fifth mask process for forming an LCD device according to the first exemplary embodiment of the present invention.
Figure 8B:
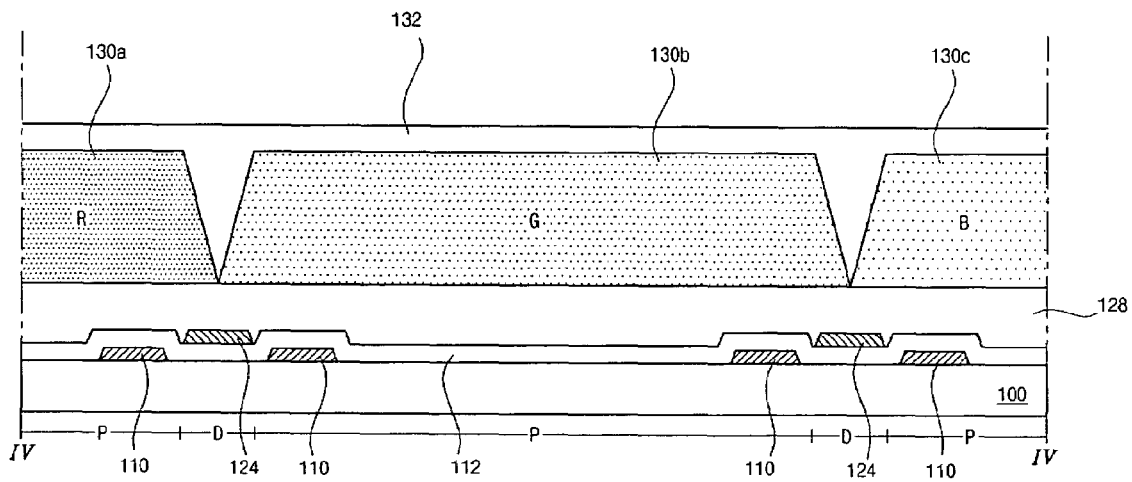
Figure 8C:
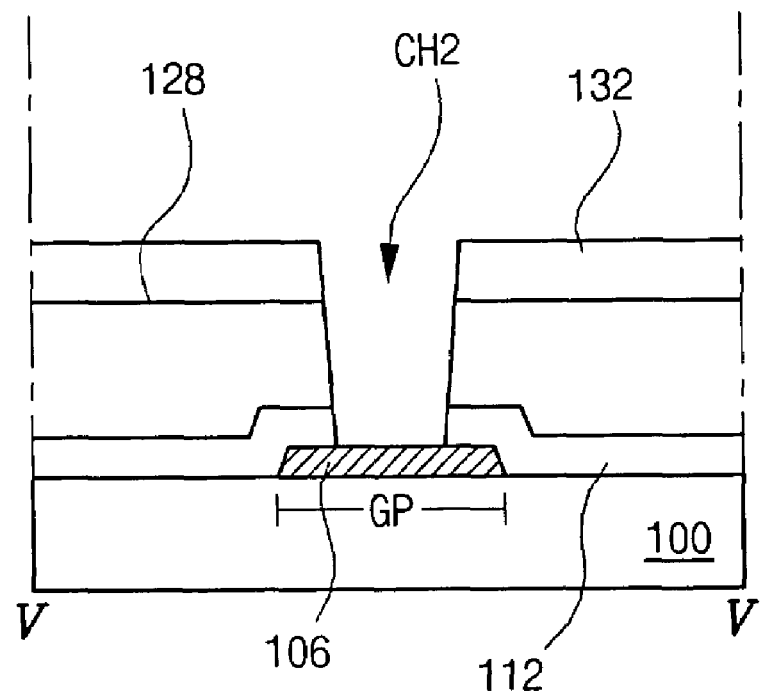
Figure 8D:
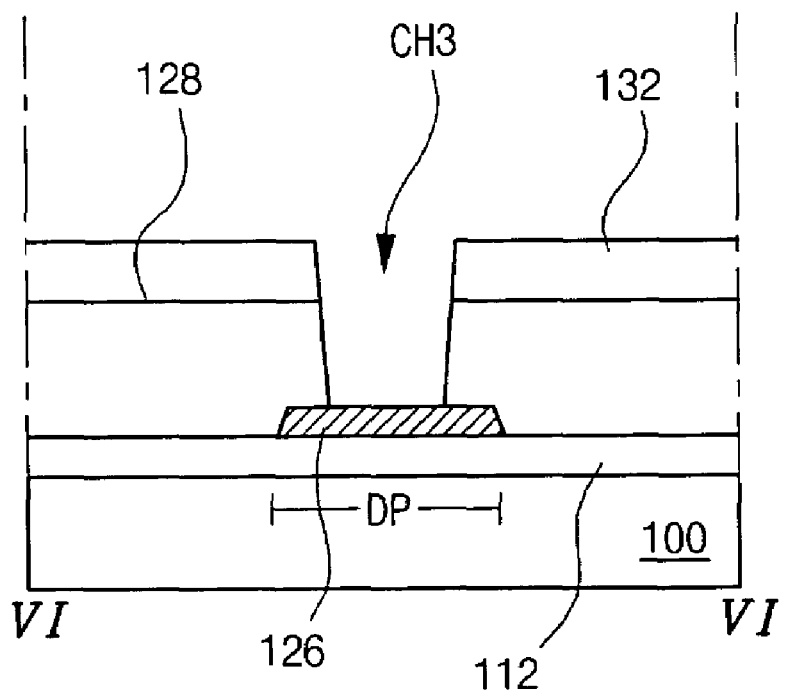
Figure 9A:
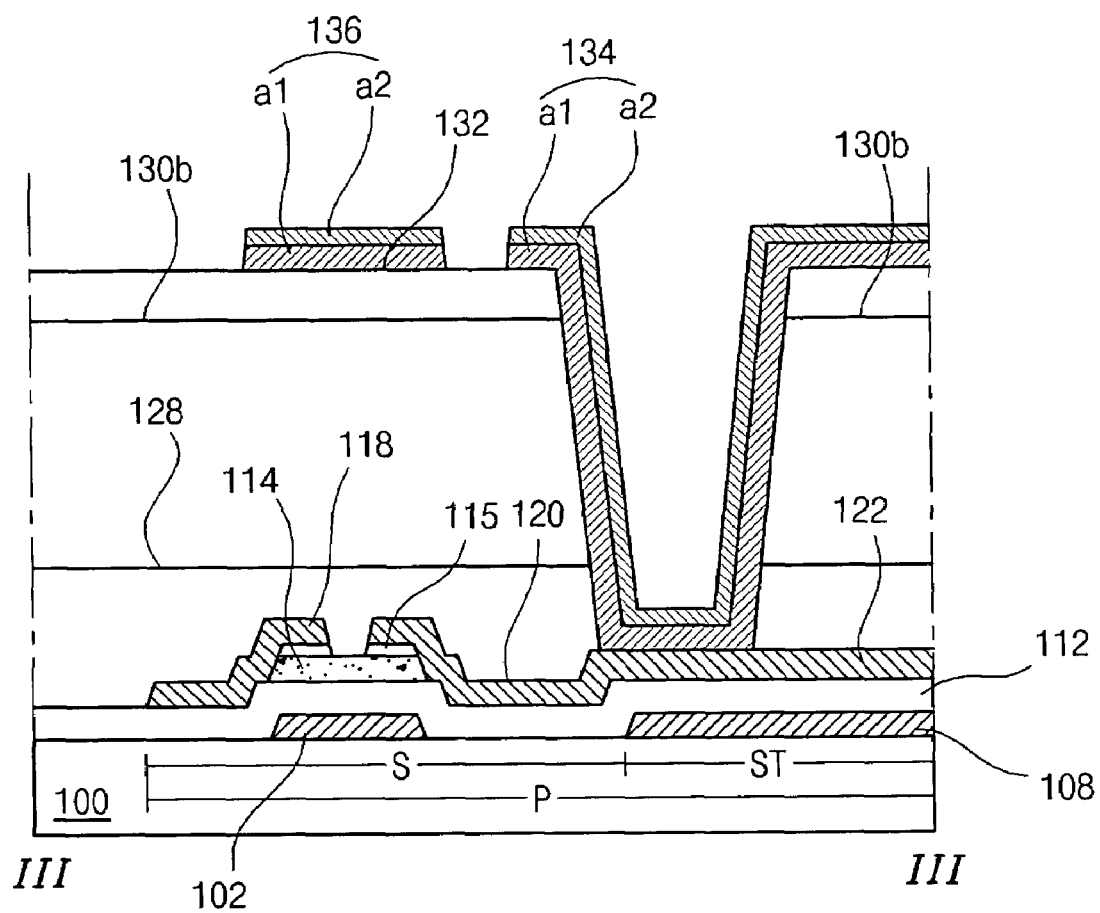
FIGS. 9A to 9D are cross-sectional views taken along lines III-III, IV-IV, V-V and VI-VI of FIG. 3, respectively, of a sixth mask process for forming an LCD device according to the first exemplary embodiment of the present invention.
Figure 9B:
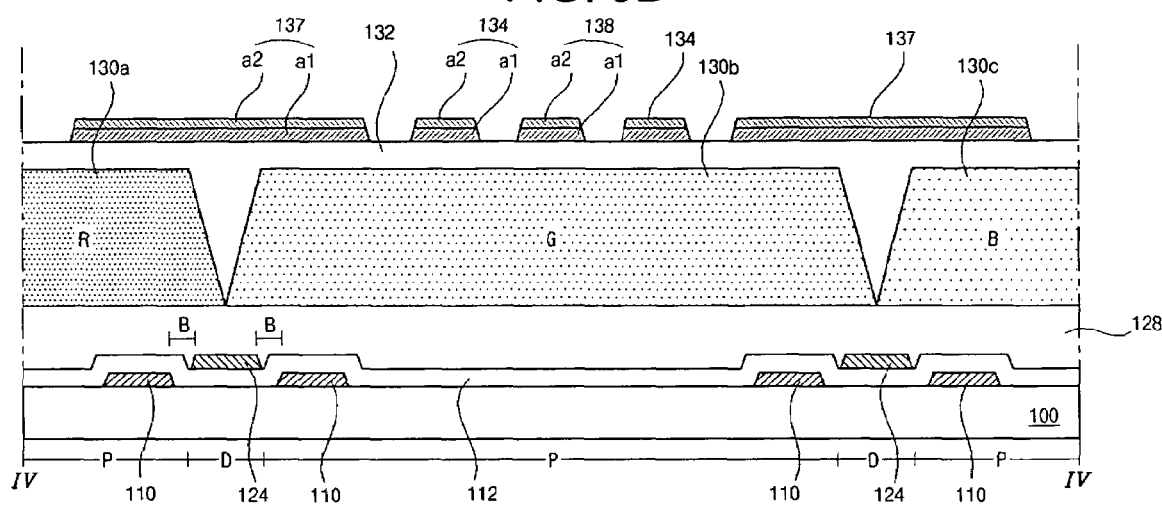
Figure 9C:
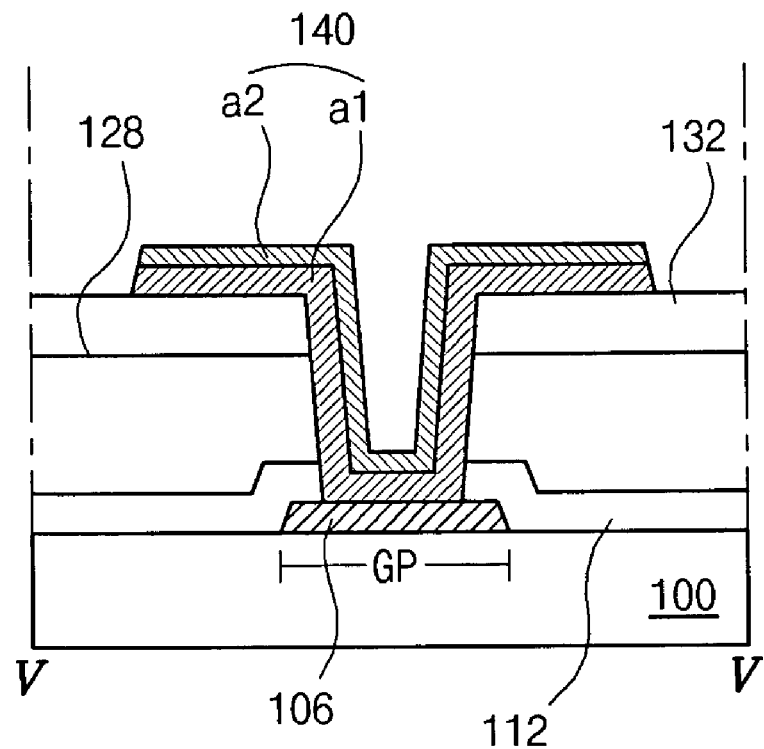
Figure 9D:
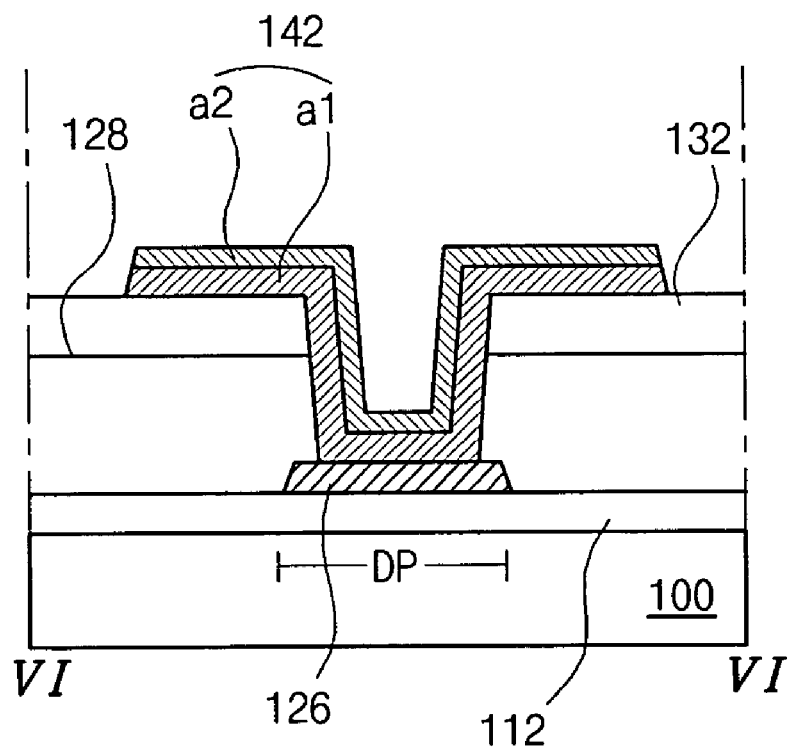
Figure 10A:
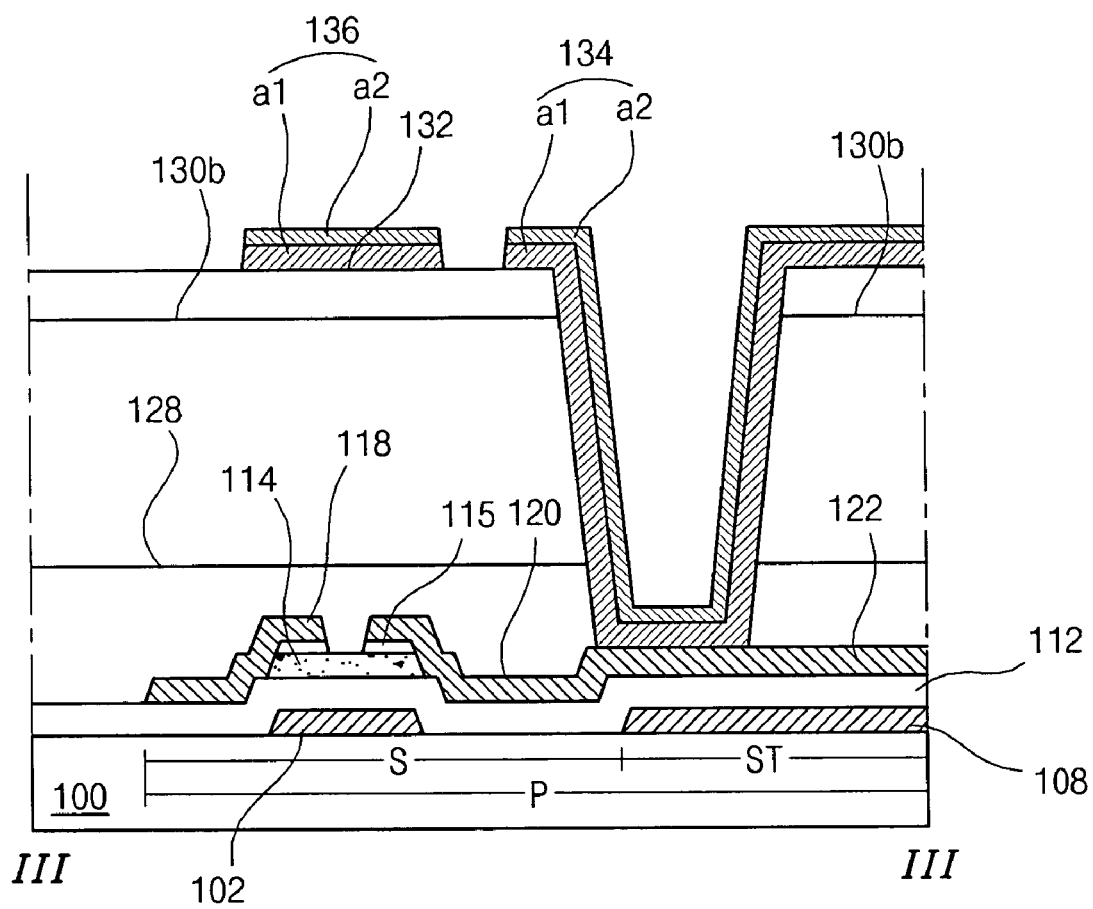
FIGS. 10A to 10D are cross-sectional views taken along lines III-III, IV-IV, V-V and VI-VI of FIG. 3, respectively, of a seventh mask process for forming an LCD device according to an first exemplary embodiment of the present invention.
Figure 10B:
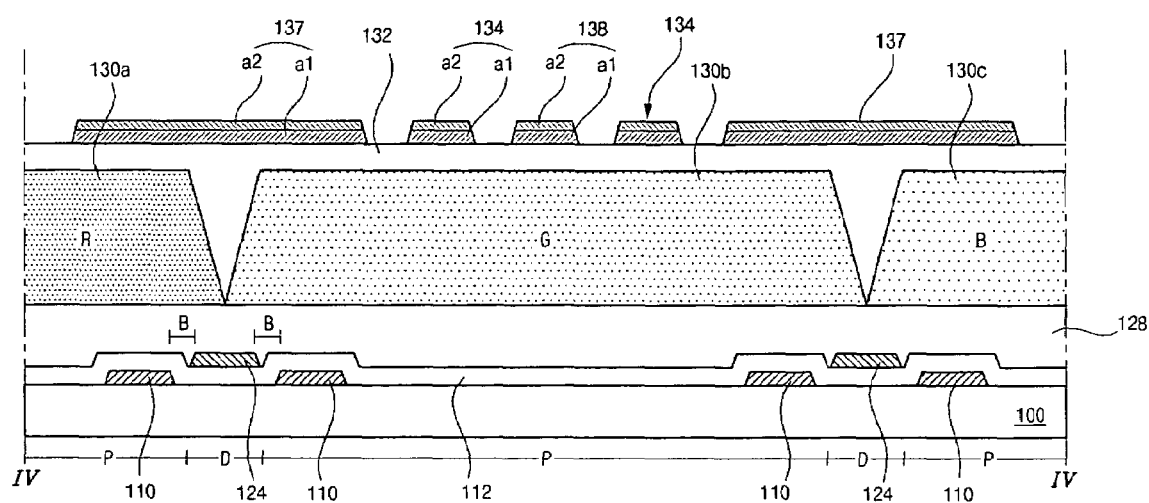
Figure 10C:
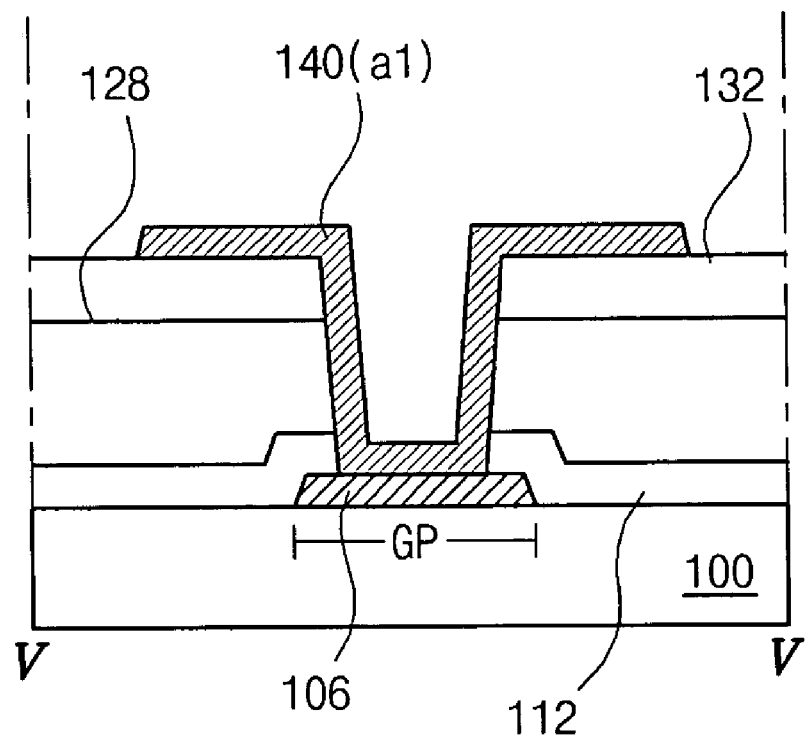
Figure 10D:
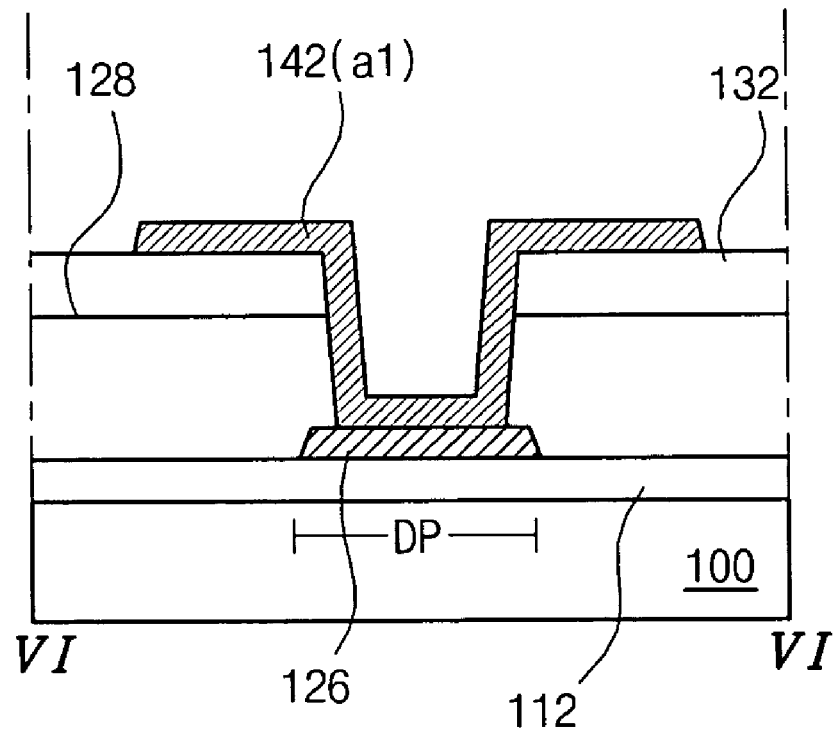

Reference will now be made in detail to the illustrated embodiments of the present invention, which are illustrated in the accompanying drawings. FIG. 3 is a plan view of an LCD structure according to a first exemplary embodiment of the present invention. As shown in FIG. 3, a gate line 104 and a data line 124 are disposed on a substrate 100 and cross each other to define a pixel region "P". The data line 124 may have a bend shape. For example, the data line 124 has a first straight portion and a second straight portion with an oblique angle at the connection of the first straight portion and the second straight portion. A gate pad electrode 106 is disposed on one end of the gate line 104, and a data pad electrode 126 is disposed on one end of the data line 124. A gate pad electrode terminal 140 and a data pad electrode terminal 142 are disposed on the gate and data pad electrodes 106 and 126, respectively.

A thin film transistor "T" is disposed adjacent to the crossing of the gate and data lines 104 and 124. The thin film transistor "T" includes a gate electrode 102, a semiconductor pattern 116, and source and drain electrodes 118 and 120.

Red (R), green (G) and blue (B) color filter patterns 130a, 130b and 130c are disposed in respective pixel regions "P". A pixel electrode 134 contacts a storage electrode 122 extended from the drain electrode 120, and thus the pixel electrode 134 is connected to the drain electrode 120. The pixel electrode 134 may have a bend shape. For example, the pixel electrode may have a first straight portion and a second straight portion with an oblique angle at the connection of the first straight portion and the second straight portion.

A first common line 108 is apart from and extended along an extension direction of the gate line 104. A first common electrode 110 is extended from the first common line 108 and is disposed at side portions of the pixel region "P". The first common electrode 110 may have a bend shape. For example, the first common electrode may have a first straight portion and a second straight portion with an oblique angle at the connection of the first straight portion and the second straight portion. The first common line 108 and the capacitor electrode 122 overlap each other to define a storage capacitor "$C_{ST}$".

A second common line 136 is disposed on the gate line 104, and is extended along an extension direction of the gate line 104. A second common electrode 138 is extended from the second common line 136. A shielding portion 137 is extended from the second common line 136 to adjacent second common line 136 along an extension direction of the data line 124 between the adjacent second common lines 136. The second common electrode 138 and the shielding portion 137 may have bend shapes. For example, they may have a first straight portion and a second straight portion with an oblique angle at the connection of the first straight portion and the second straight portion. The second common line 136 may be directly above and cover the thin film transistor "T" and the gate line 104. The shielding portion 137 may be directly above and cover the data line 124 such that the second common line 136 and the shielding portion 137 may act as a black matrix. In particular, the shielding portion 137 may cover an area between the data line 124 and the first common electrode 110 to prevent light leakage through the area. Further, the shielding portion 137 may cover the first common electrode 110.

The pixel electrode 134 and the first and second common electrodes 110 and 138 are disposed on the same substrate 100 and thus generate in-plane electric fields therebetween. In particular, the pixel and common electrodes 134, 110 and 138 have bend shapes, e.g., a first straight portion and a second straight portion with an oblique angle at the connection of the first straight portion and the second straight portion, and thus two domains are generated such that the two in-plane electric fields induced in the two domains are substantially symmetrical to each other. The first common electrodes 110 are disposed at both sides close to the data line 124 to prevent the data line 110 from interfering the pixel electrode 134.

The first common line 108 is the same layer as the gate line 104, and both the pixel electrode 138 and the second common electrode 134 are the same layer as the data line 124. Further, both the pixel electrode 138 and the second common electrode 134 may have three conductive layers i.e., an opaque conductive layer, a low reflective conductive layer and a transparent conductive layer. The opaque conductive layer is used to shield a light incident to the thin film transistor "T". The low reflective conductive layer is used to reduce high reflectivity of the opaque conductive layer.

In the LCD device of the exemplary embodiments of the present invention, the color filter pattern is formed on the substrate where the thin film transistor, gate and data lines and other layers are also formed. Accordingly, misalignment in attaching the two substrates for the LCD is no longer a concern. Thus, the aperture ratio of the LCD can increase and light leakage can be reduced. Further, since the second common line and the shielding portion act as a black matrix, processes for forming a black matrix are not required.

Further, the pixel and common electrodes are formed on the same substrate to induce the in-plane electric field, and, in particular, the pixel and common electrodes have bend shapes such that the two domains are generated. Accordingly, this design provides for a wider range of viewing angles. Further, the pixel and common electrodes have the opaque conductive layer to shield a light incident to the thin film transistor and the low reflective conductive layer to reduce high reflectivity of the opaque conductive layer. Therefore, the display quality can be improved.

FIGS. 4A to 4D are cross-sectional views taken along lines III-III, IV-IV, V-V and VI-VI of FIG. 3, respectively, of first and second mask processes for forming an LCD device according to the first exemplary embodiment of the present invention. As shown in FIGS. 4A to 4D, a first metal layer is deposited on a substrate 100 having a pixel region "P", a switching region "S", a storage region "ST", a gate pad region "GP", a data pad region "DP" and a data region "D". The first metal layer is patterned with a first mask process to form a gate line 104, a gate electrode 102, a gate pad electrode 106, a first common line 108 and a first common electrode 110. The gate pad electrode 106 is formed in the gate pad region "GP". The gate electrode 102 in the switching region "S" may be portions of the gate line 104 or protrusion portions extended from the gate line 104. The first metal layer may be at least one of aluminum (Al), aluminum alloy (AlNd), copper (Cu), tungsten (W), chromium (Cr), molybdenum (Mo) and titanium (Ti).

A gate insulator 112 is formed on the entire surface of the substrate 100 having the gate line 104. The gate insulator 112 can be made of an inorganic insulating material, such as silicon nitride (SiNx) and/or silicon oxide (SiO$_2$).

An intrinsic amorphous silicon (a-Si:H) and an impurity-doped amorphous silicon (n+a-Si:H) are sequentially deposited on the gate insulator 112, and are patterned with a second mask process to form a semiconductor pattern 116. The semiconductor pattern 116 includes an active layer 114 of the intrinsic amorphous silicon and an ohmic contact layer 115 of the impurity-doped amorphous silicon.

FIGS. 5A to 5D are cross-sectional views taken along lines III-III, IV-IV, V-V and VI-VI of FIG. 3, respectively, of a third mask process for forming an LCD device according to the first exemplary embodiment of the present invention. As shown in FIGS. 5A to 5D, a second metal layer is deposited on the substrate 100 having the semiconductor pattern 116. The second metal layer is patterned with a third mask process to form a data line 124, source and drain electrodes 118 and 120, a data pad electrode 126 and a storage electrode 122. The data line 124 in the data region "D" is formed between the first common electrodes 110 in adjacent pixel regions "P". The data pad electrode 126 is formed in the data pad region "DP", and the storage electrode 122 overlaps the first common line 108 in the storage region "ST". Portions of the ohmic contact layer 115 is etched through the source and drain electrodes 118 and 120 apart from each other to expose portions of the active layer 114. The second metal layer may be at least one of aluminum (Al), aluminum alloy (AlNd), copper (Cu), tungsten (W), chromium (Cr), molybdenum (Mo) and titanium (Ti). Through the first to third mask processes, the thin film transistor "T" (of FIG. 3) including the gate electrode 102, the semiconductor pattern 116 and the source and drain electrodes 118 and 120 is formed.

FIGS. 6A to 6D are cross-sectional views taken along lines III-III, IV-IV, V-V and VI-VI of FIG. 3, respectively, of an LCD structure having a passivation layer according to the first exemplary embodiment of the present invention. As shown in FIGS. 6A to 6D, a passivation layer 128 is formed on the entire surface of the substrate 100 having the data line 124. The passivation layer 128 may be made of an inorganic insulating material such as silicon nitride (SiNx) and/or silicon oxide ($SiO_2$), or an organic insulating material such as benzo-cyclo-butene (BCB) and/or acrylic resin.

FIGS. 7A to 7D are cross-sectional views taken along lines III-III, IV-IV, V-V and VI-VI of FIG. 3, respectively, of a fourth mask process for forming an LCD device according to the first exemplary embodiment of the present invention. As shown in FIGS. 7A to 7D, red (R), green (G) and blue (B) color resins are sequentially deposited, and are patterned with a fourth mask process to form red (R), green (G) and blue (B) color filter patterns 130a, 130b and 130c in respective pixel regions "P".

A planarization layer 132 is formed on the entire surface of the substrate 100 having the color filter patterns 130a, 130b and 130c. The planarization layer 132 may be made of an organic insulating material such as benzo-cyclo-butene (BCB) and/or acrylic resin.

FIGS. 8A to 8D are cross-sectional views taken along lines III-III, IV-IV, V-V and VI-VI of FIG. 3, respectively, of a fifth mask process for forming an LCD device according to the first exemplary embodiment of the present invention. As shown in FIGS. 8A to 8D, with a fifth mask process, first, second and third contact holes "CH1", "CH2" and "CH3" are formed. The first contact hole "CH1" are formed by etching the planarization layer 132, each of the color filter patterns 130a, 130b and 130c, and the passivation layer 128. Therefore, the first contact hole "CH1" exposes the storage electrode 122 in the storage region "ST". The second contact hole "CH2" is formed by etching the planarization layer 132, the passivation layer 128 and the gate insulator 112. Therefore, the second contact hole "CH2" exposes the gate pad electrode 106 in the gate pad region "GP". The third contact hole "CH3" is formed by etching the planarization layer 132 and the passivation layer 128. Therefore, the third contact hole "CH3" exposes the data pad electrode 126 in the data pad region "DP".

FIGS. 9A to 9D are cross-sectional views taken along lines III-III, IV-IV, V-V and VI-VI of FIG. 3, respectively, of a sixth mask process for forming an LCD device according to the first exemplary embodiment of the present invention. As shown in FIGS. 9A to 9D, a first conductive layer "a1" and a second conductive layer "a2" are deposited sequentially on the planarization layer 132, and patterned to form a pixel electrode 134, a second common line 136, a shielding portion 137, a second common electrode 138, a gate pad electrode terminal 140 and a data pad electrode terminal 142. The first conductive layer "a1" may be made of an opaque conductive material such as aluminum (Al), aluminum alloy (AlNd), copper (Cu), tungsten (W), chromium (Cr), molybdenum (Mo) and/or titanium (Ti). In particular, chromium (Cr) may be effectively used as the first conductive layer "a1". The second conductive layer "a2" may be made of a low reflective conductive material such as chromium oxide (CrOx). The second conductive layer "a2" has a reflectivity less than a reflectivity of the first conductive layer "a1". The shielding portion 137 is directly above and covers the area "B" between the first common electrode 110 and the data line 124.

FIGS. 10A to 10D are cross-sectional views taken along lines III-III, IV-IV, V-V and VI-VI of FIG. 3, respectively, of a seventh mask process for forming an LCD device according to an first exemplary embodiment of the present invention. As shown in FIGS. 10A to 10D, the patterned second conductive layer "a2" of each of the gate and data pad electrode terminals 140 and 142 is removed with a seventh mask process. Therefore, the patterned first conductive layer "a1" remains in the gate and data pad electrode terminals 140 and 142. The reason for removing the second conductive layer "a2" is to avoid the high resistance of the second conductive layer "a2" in the gate and data pad electrode terminals 140 and 142 contacting exterior driving circuits.

Figure 11A:
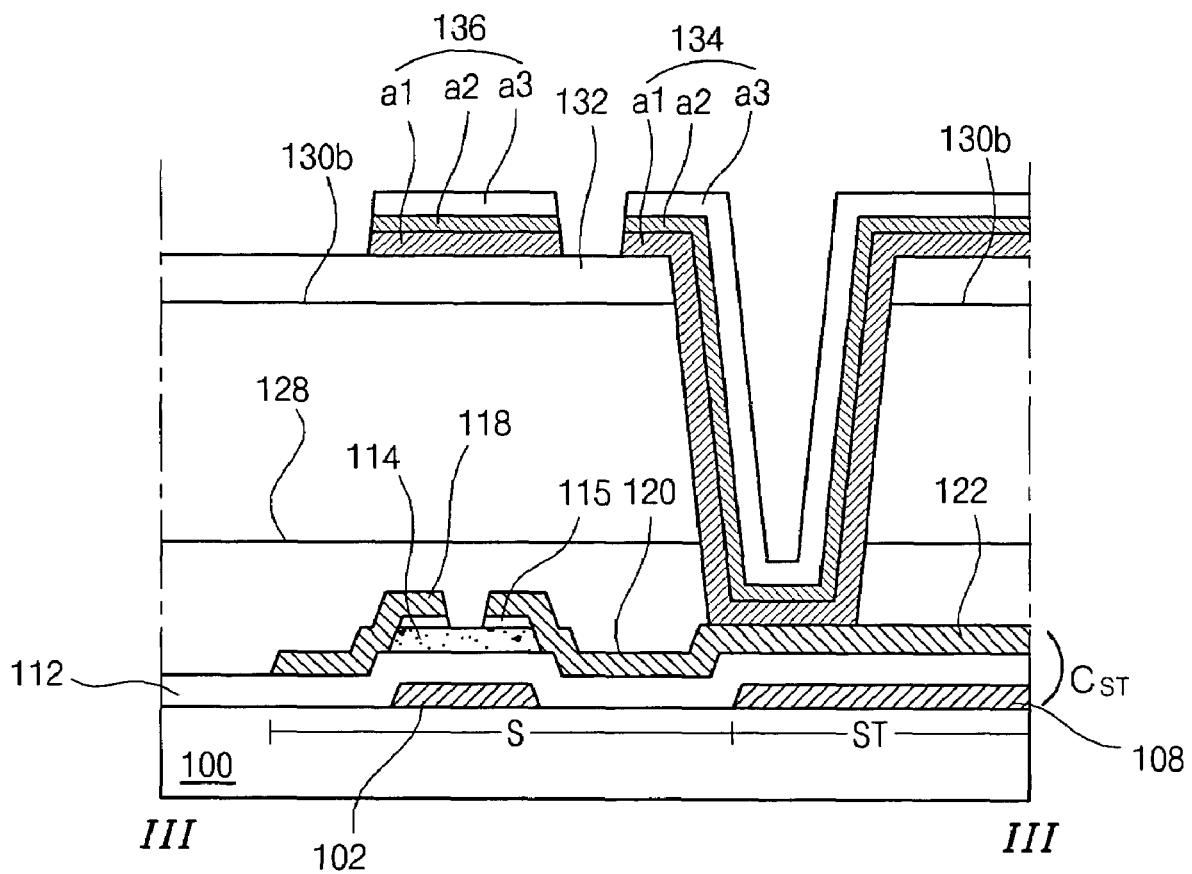
FIGS. 11A to 11D are cross-sectional views taken along lines III-III, IV-IV, V-V and VI-VI of FIG. 3, respectively, of an eighth mask process for forming an LCD device according to an first exemplary embodiment of the present invention.

FIGS. 11A to 11D are cross-sectional views taken along lines III-III, IV-IV, V-V and VI-VI of FIG. 3, respectively, of an eighth mask process for forming an LCD device according to an first exemplary embodiment of the present invention. As shown in FIGS. 11A to 11D, a third conductive layer "a3" is deposited on the substrate 100 and patterned with a eighth mask process. Thus, each of the pixel electrode 134, the second common line 136, the shielding portion 137, the second common electrode 138 further has the patterned third conductive layer "a3" on each patterned second conductive layer "a2", and each of the gate pad electrode terminal 140 and the data pad electrode terminal 142 further has the patterned third conductive layer "a3" on each patterned first conductive layer "a1". The third conductive layer "a3" may be made of a transparent conductive material such as indium-tin-oxide (ITO) and/or indium-zinc-oxide (IZO). The storage electrode 122 contacting the pixel electrode 134 overlaps the first common line 108 in the storage region "ST" to define a storage capacitor "$C_{ST}$". The storage capacitor "$C_{ST}$" includes the storage electrode 122 extended from the drain electrode of the thin film transistor. The storage electrode 122 is connected to the pixel electrode 134. The storage electrode 122 and the first common line 108 are two electrodes of the storage capacitor "$C_{ST}$". As shown in FIG. 11A, the first common line 108 and the gate line 102 are coplanar.

Through the above processes, the LCD structure of the first exemplary embodiment of the present invention can be fabricated. In this embodiment, each of the pixel electrode 134, the second common electrode 138 and the second common line 136, and the shielding portion 137 has a stack structure including the transparent layer, the opaque layer and the low reflective layer. In this embodiment, the transparent layer "a3" is at the top of the stack structure.

Figure 1:
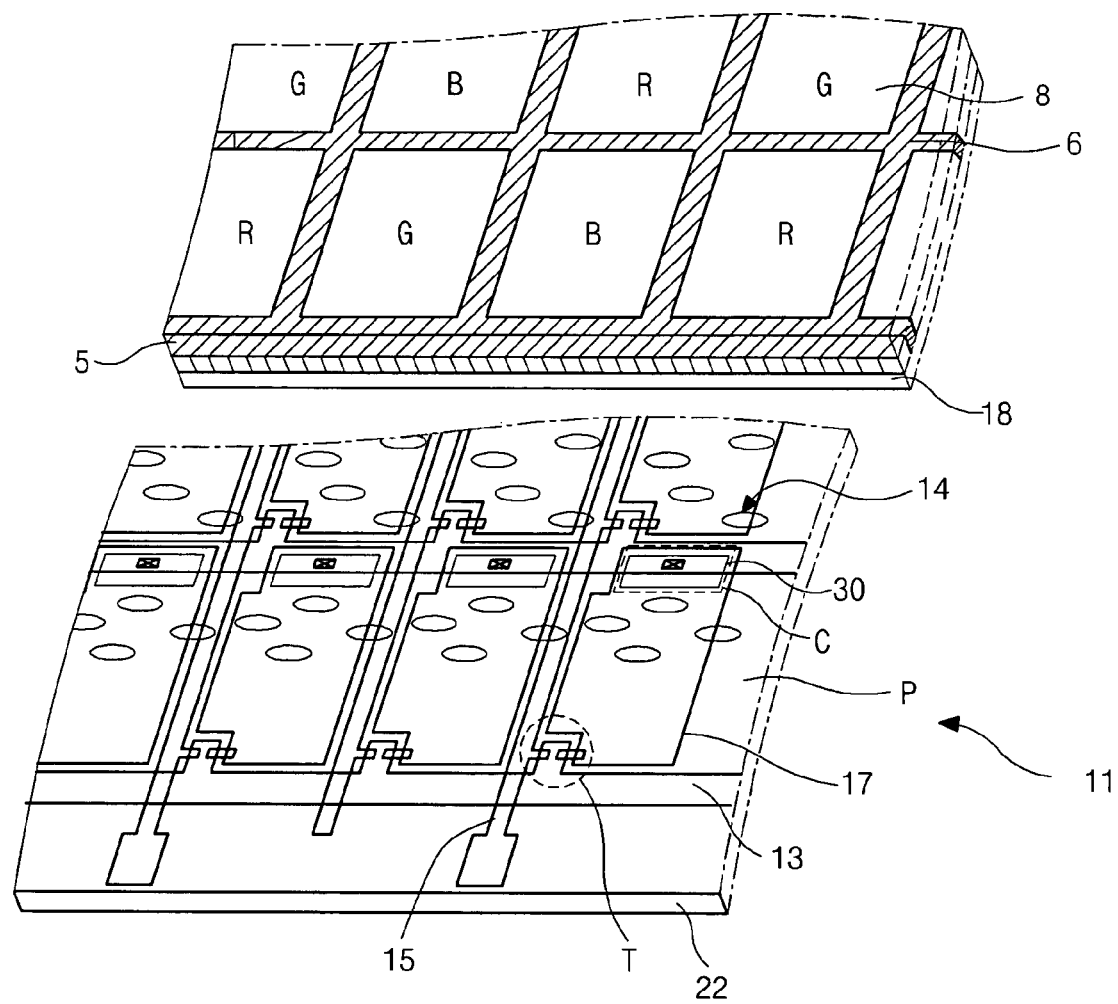
FIG. 1 is a perspective view of an LCD device according to the related art.
Figure 2:
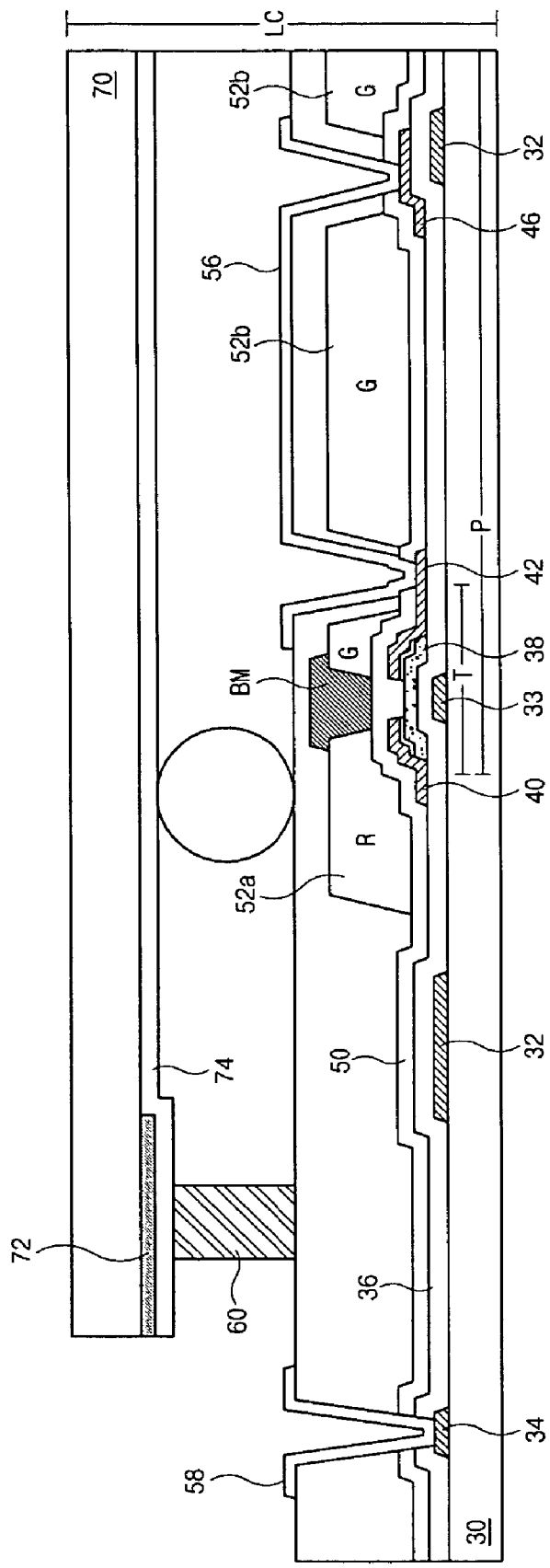
FIG. 2 is a cross-sectional view of a COT type LCD device according to the related art.
Figure 11B:
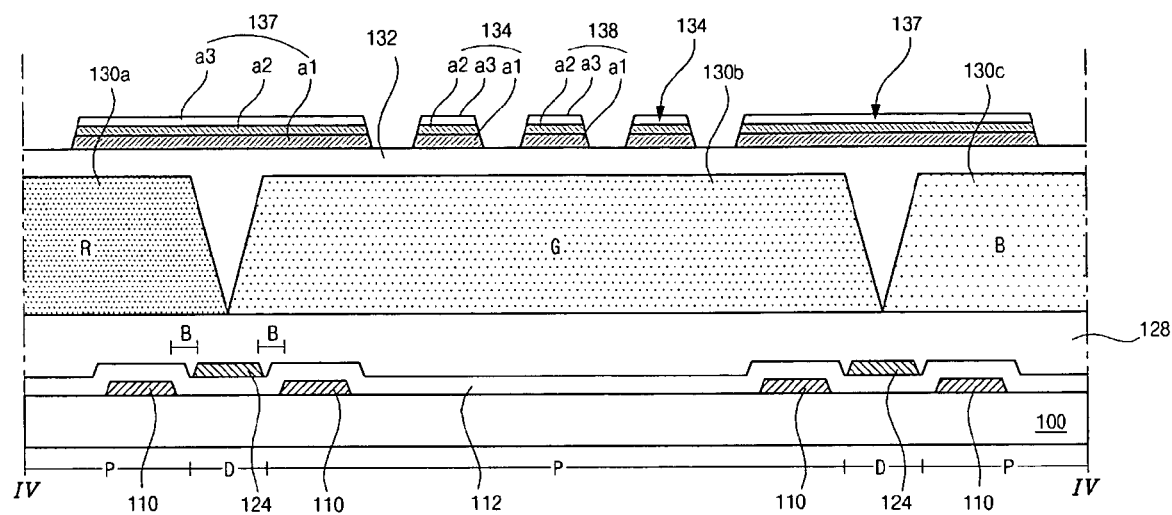
Figure 11C:
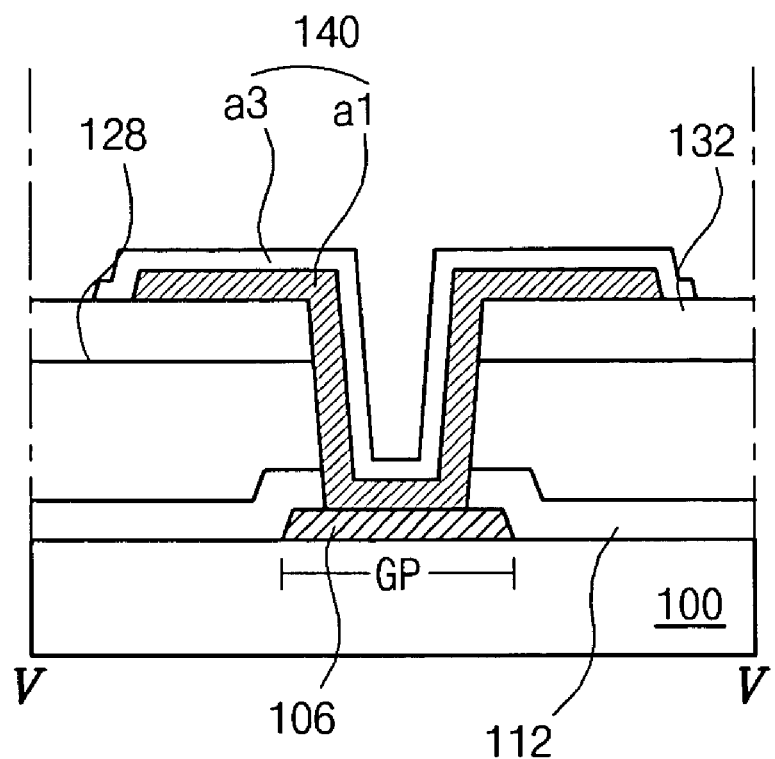
Figure 11D:
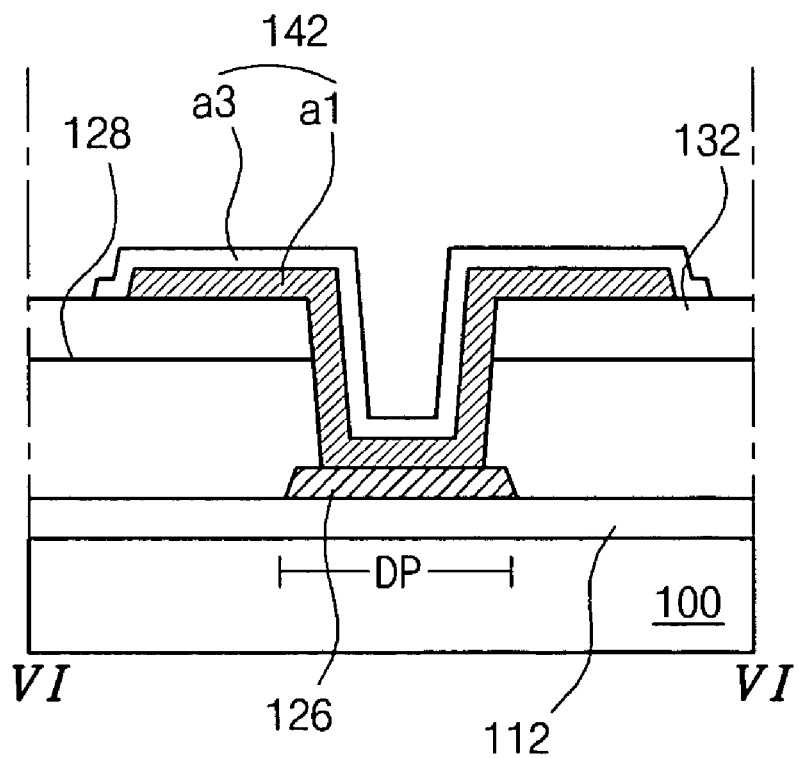
Figure 12A:
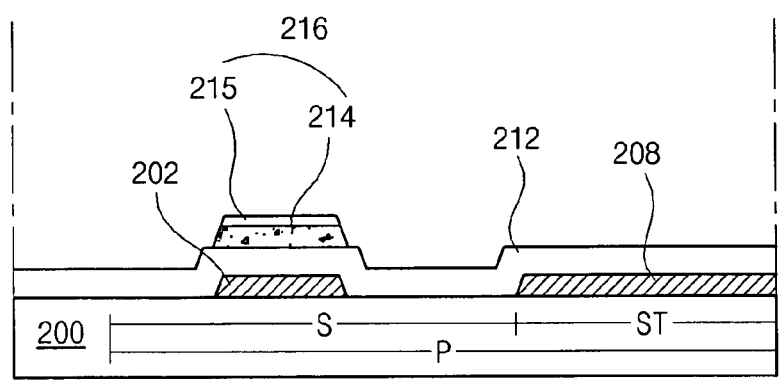
FIGS. 12A to 12D are cross-sectional views taken along lines III-III, IV-IV, V-V and VI-VI of FIG. 3, respectively, of first and second mask processes for forming an LCD device according to the second exemplary embodiment of the present invention.
Figure 12B:
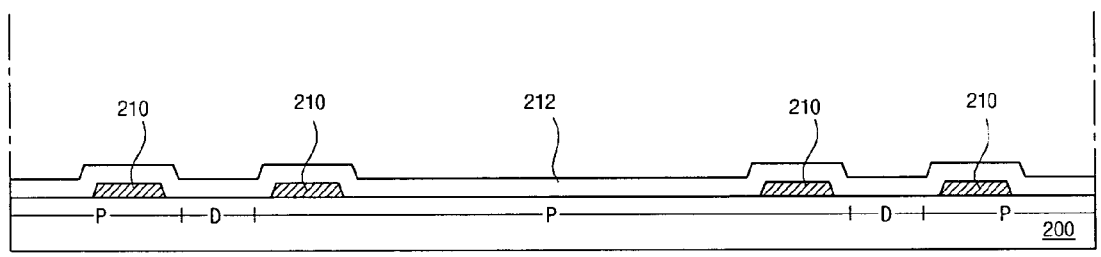
Figure 12C:
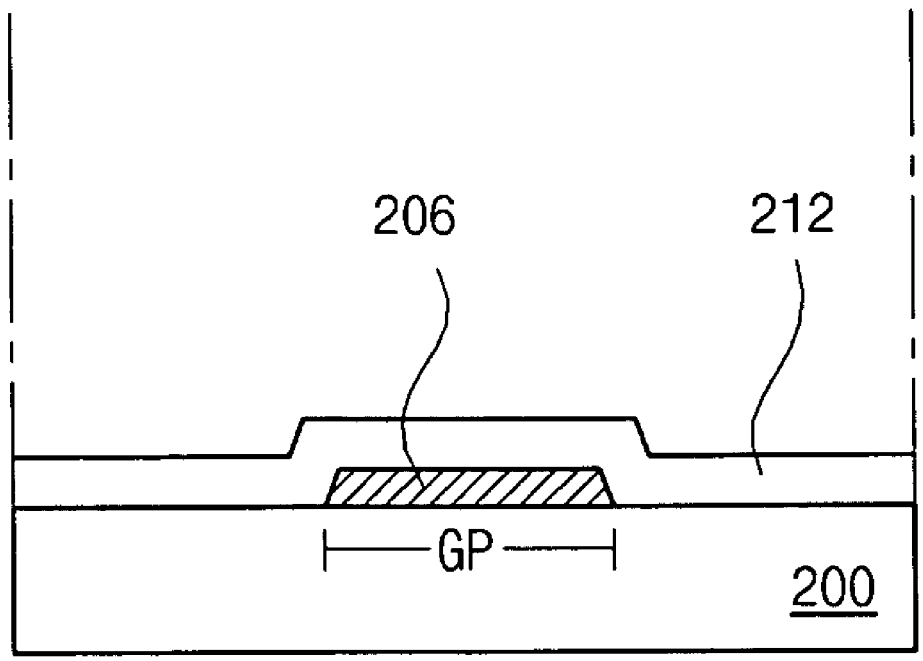
Figure 12D:
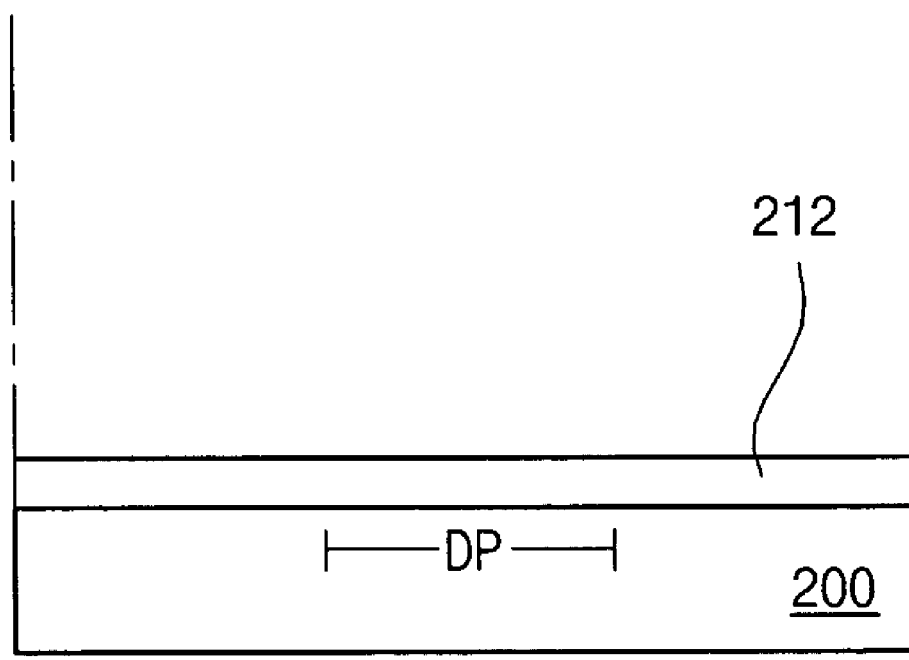
Figure 13A:
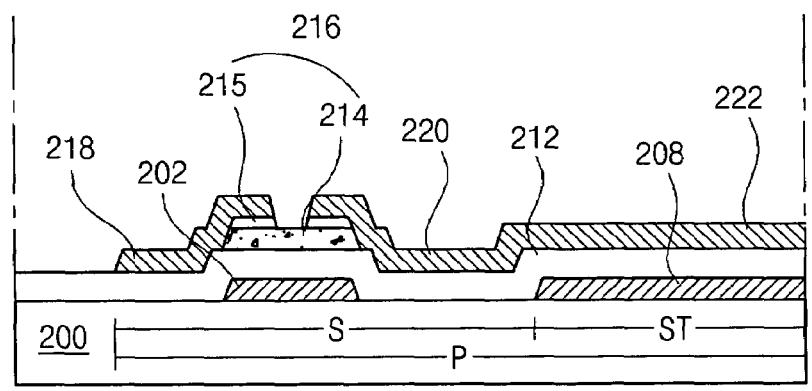
FIGS. 13A to 13D are cross-sectional views taken along lines III-III, IV-IV, V-V and VI-VI of FIG. 3, respectively, of a third mask process for forming an LCD device according to the second exemplary embodiment of the present invention.
Figure 13B:
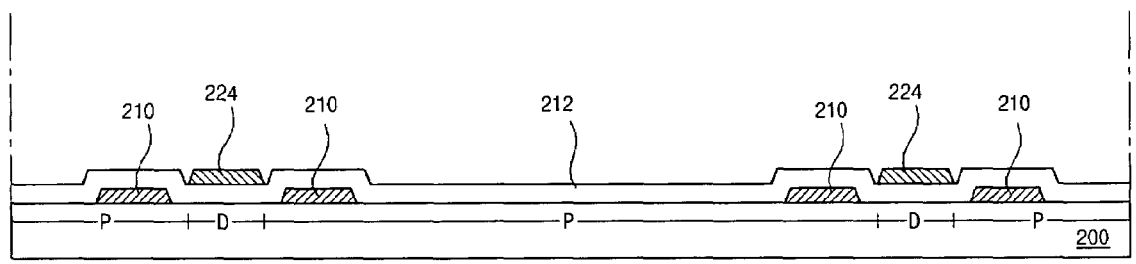
Figure 13C:
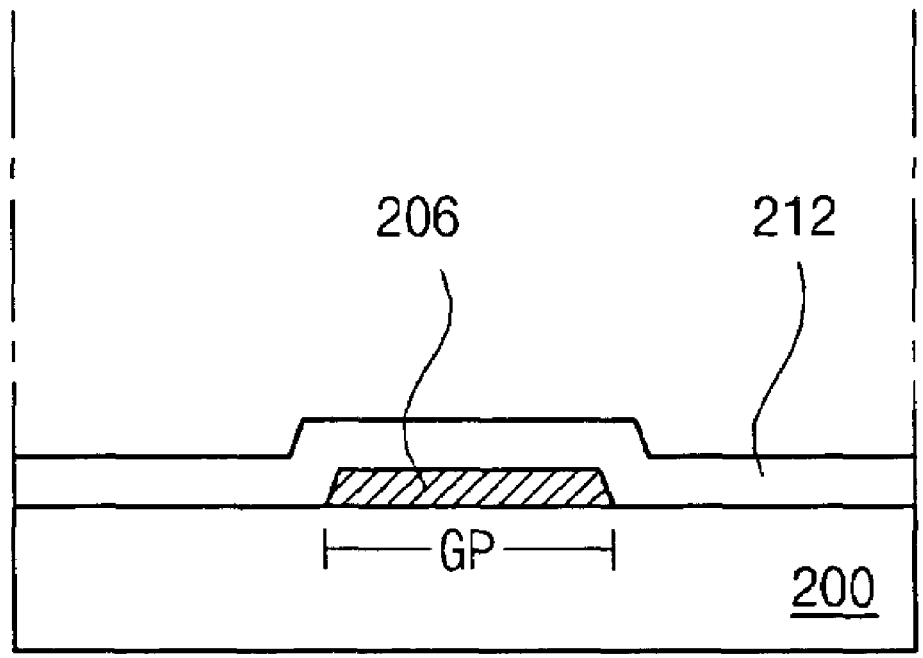
Figure 13D:
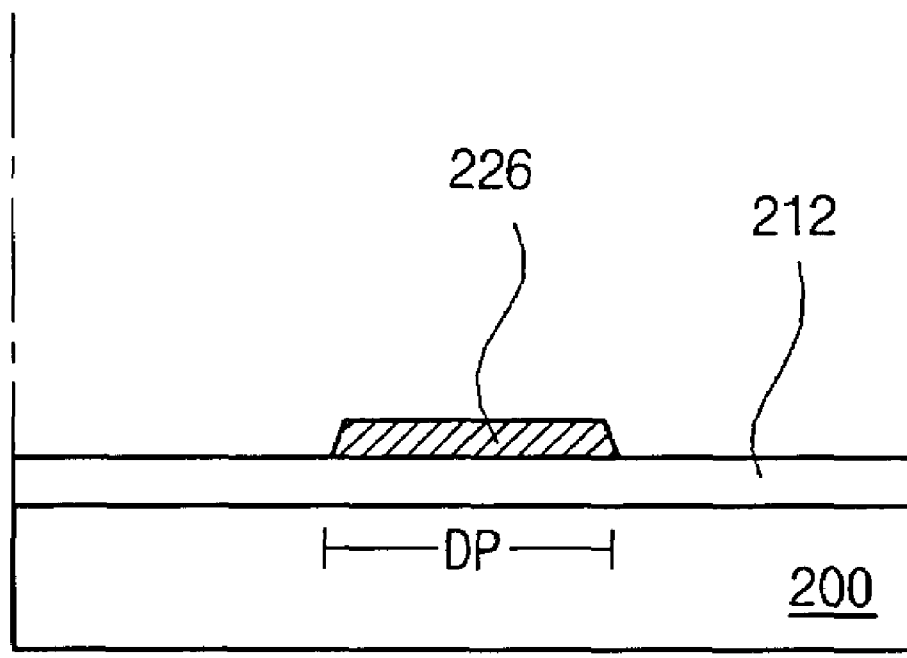
Figure 14A:
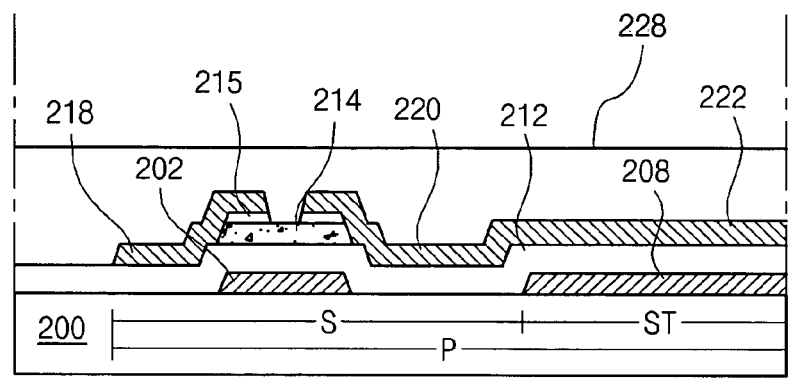
FIGS. 14A to 14D are cross-sectional views taken along lines III-III, IV-IV, V-V and VI-VI of FIG. 3, respectively, of an LCD structure having a passivation layer according to the second exemplary embodiment of the present invention
Figure 14B:
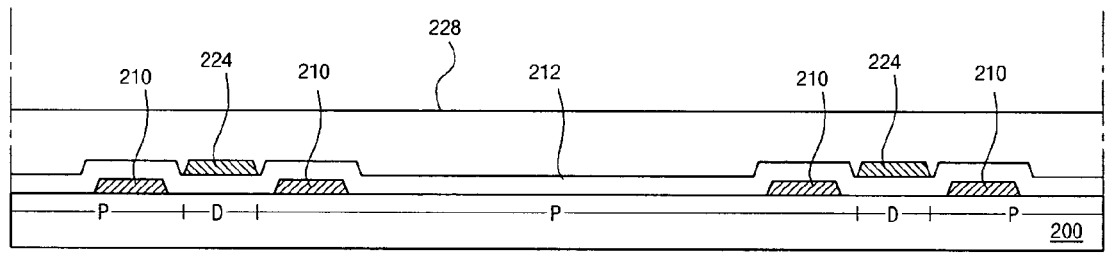
Figure 14C:
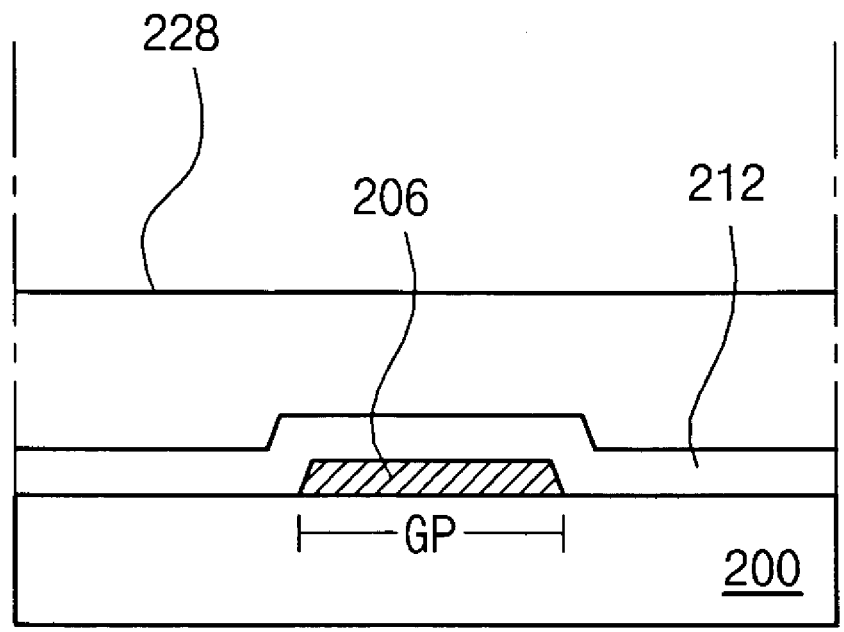
Figure 14D:
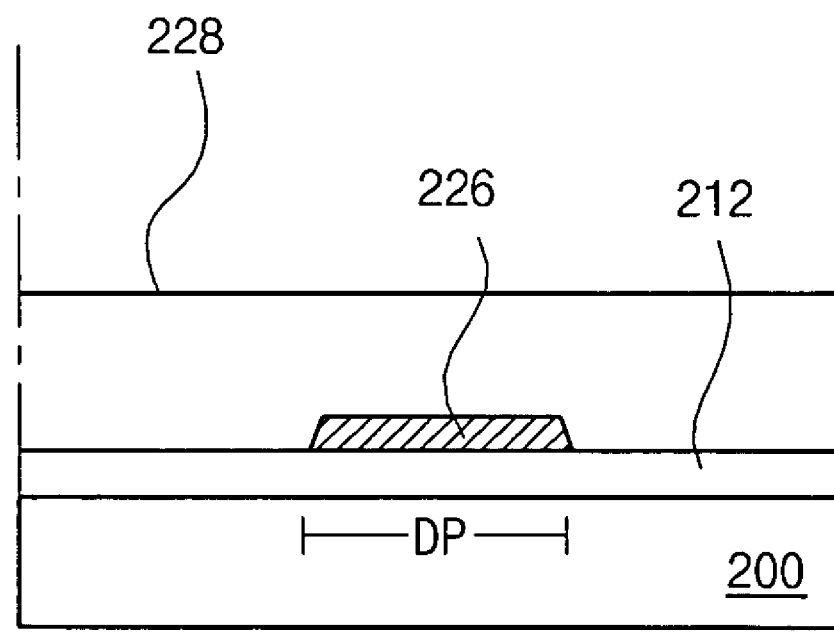
Figure 15A:
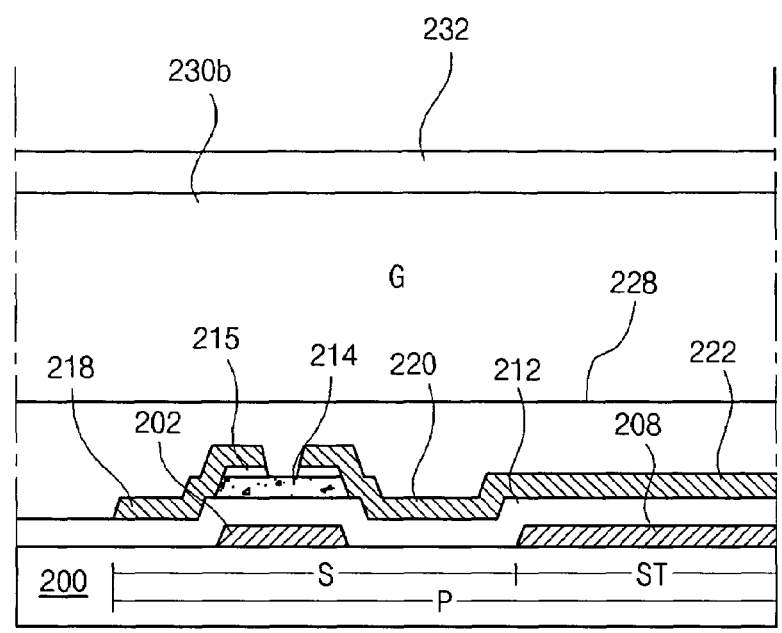
FIGS. 15A to 15D are cross-sectional views taken along lines III-III, IV-IV, V-V and VI-VI of FIG. 3, respectively, of a four mask process for forming an LCD device according to an second exemplary embodiment of the present invention.
Figure 15B:
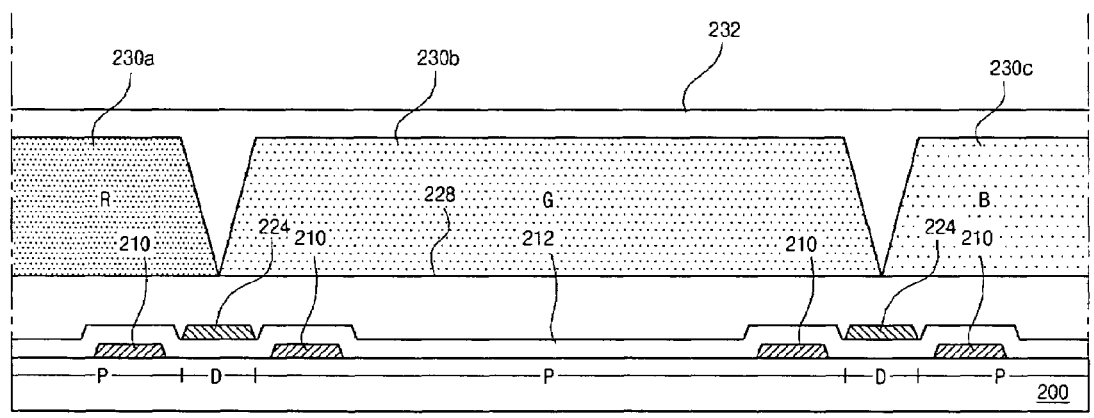
Figure 15C:
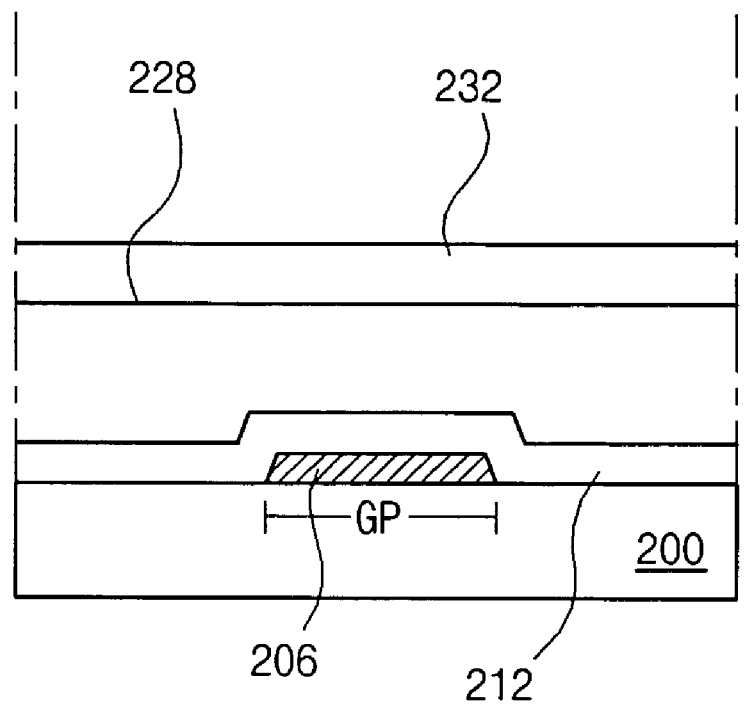
Figure 15D:
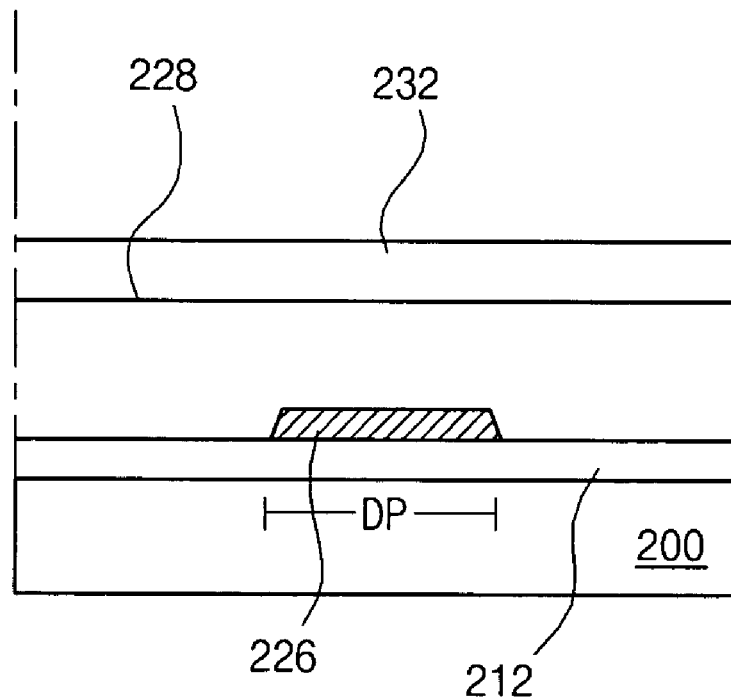
Figure 16A:
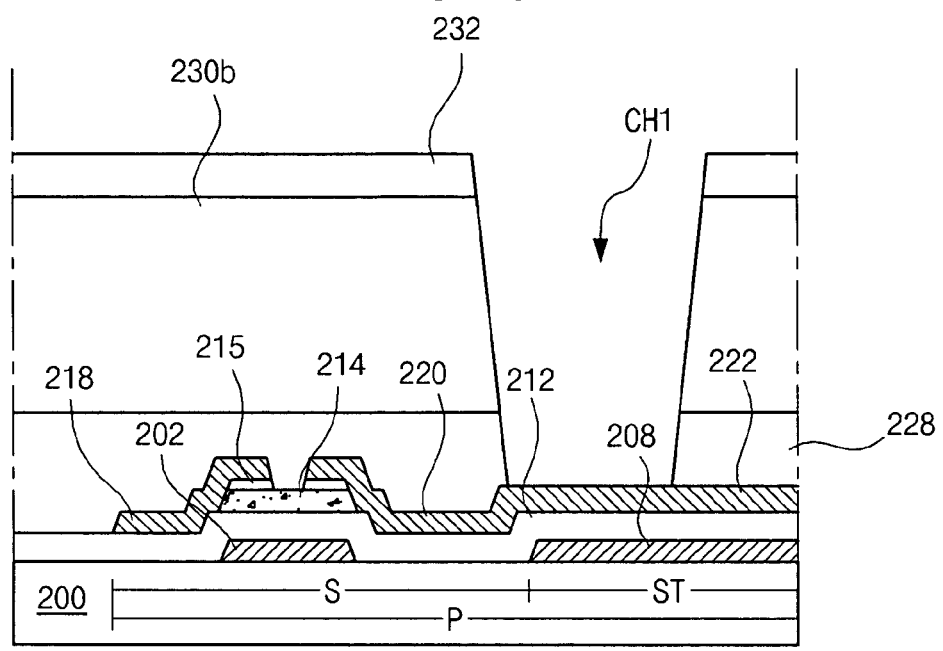
FIGS. 16A to 16D are cross-sectional views taken along lines III-III, IV-IV, V-V and VI-VI of FIG. 3, respectively, of a fifth mask process for forming an LCD device according to the second exemplary embodiment of the present invention.
Figure 16B:
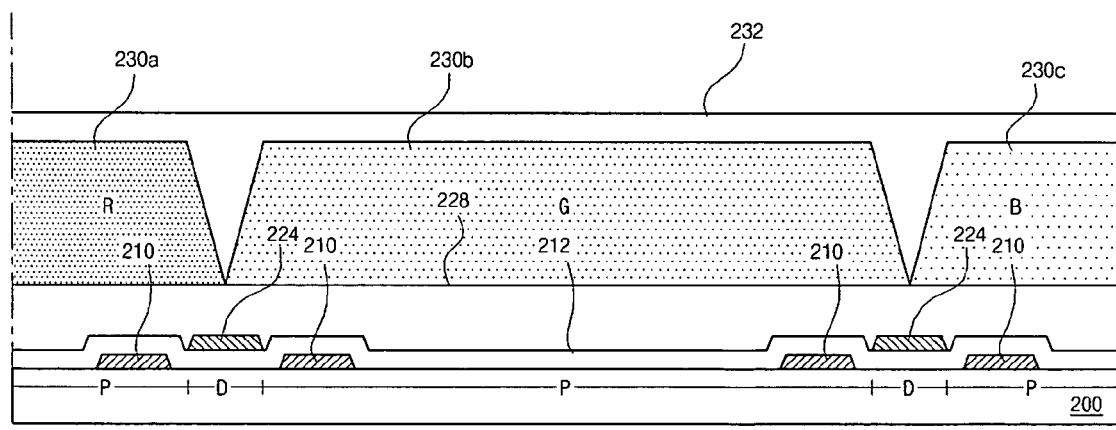
Figure 16C:
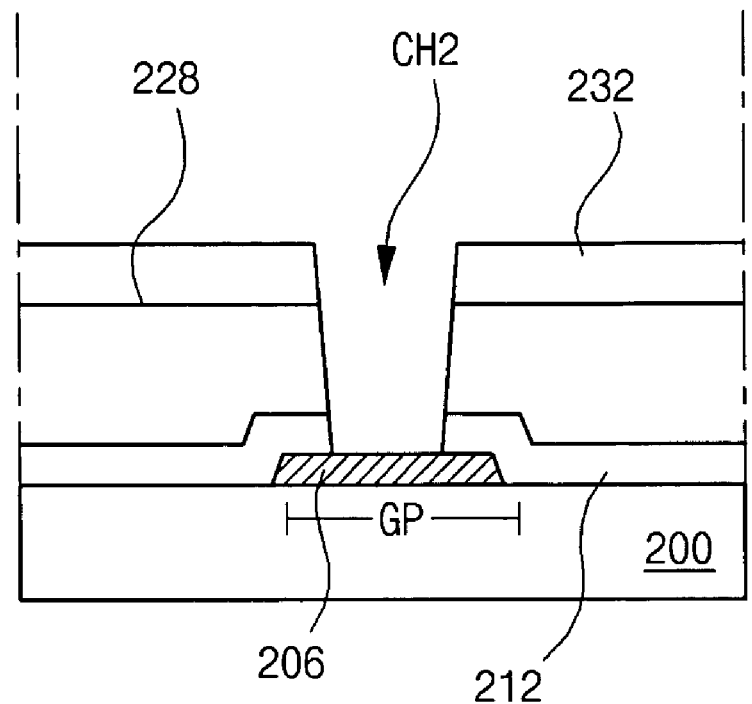
Figure 16D:
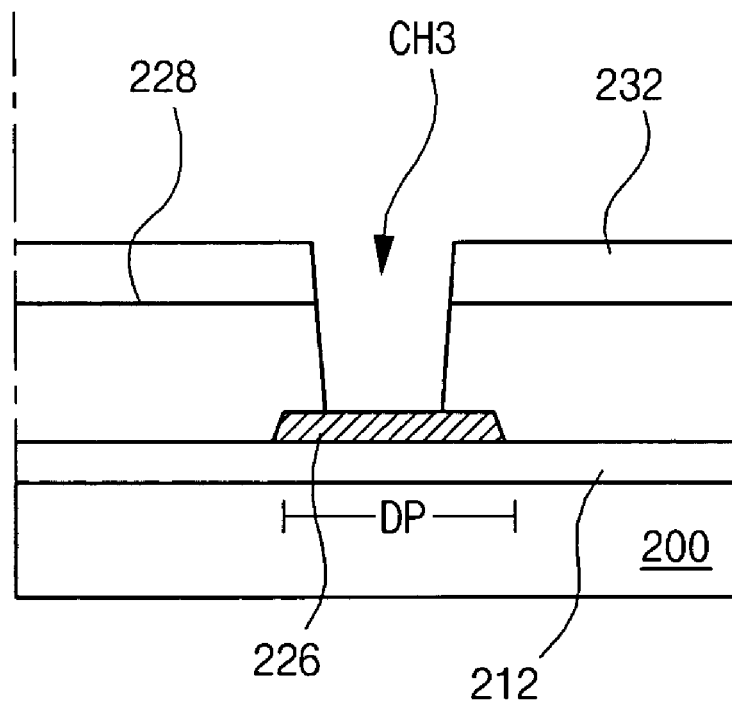
Figure 17A:
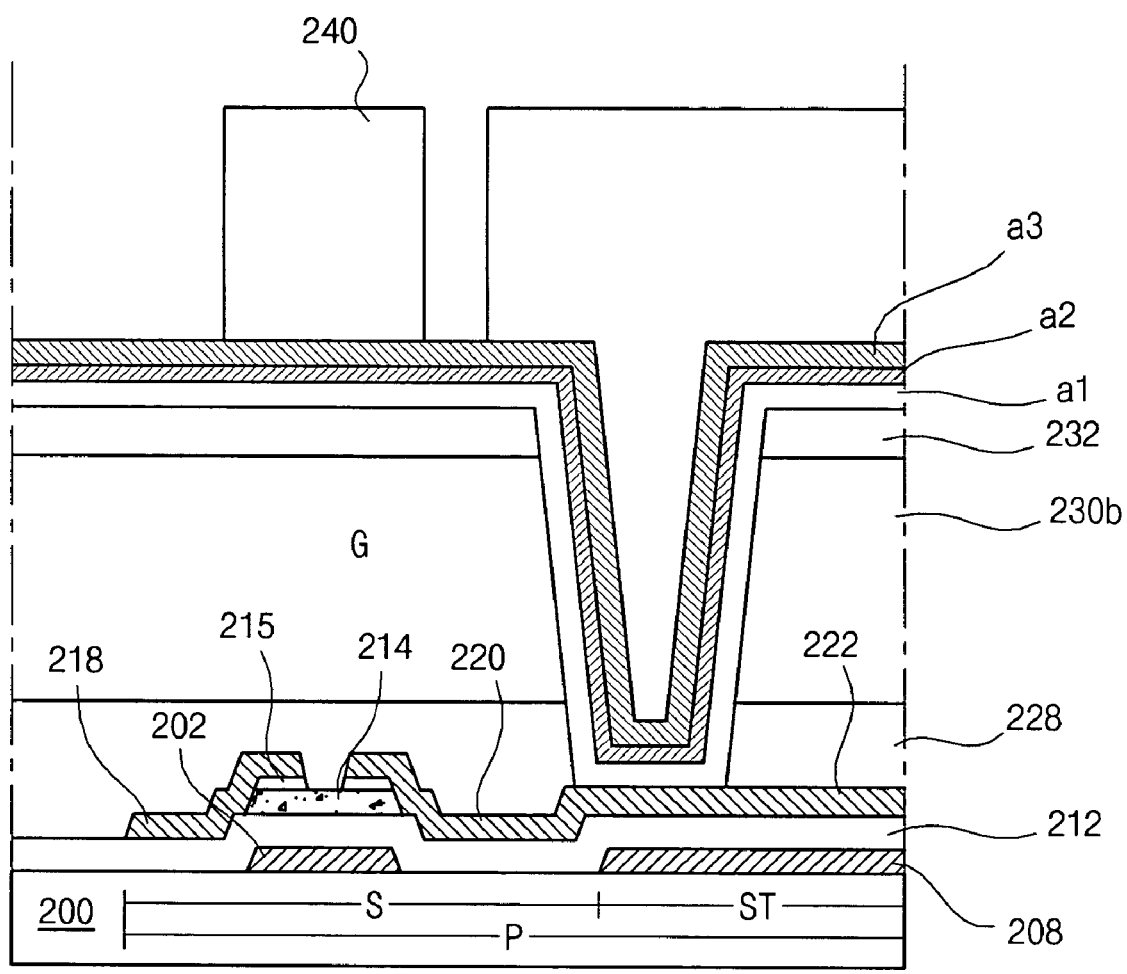
FIGS. 17A to 17D are cross-sectional views taken along lines III-III, IV-IV, V-V and VI-VI of FIG. 3, respectively, of a sixth mask process for forming an LCD device according to the second exemplary embodiment of the present invention.
Figure 17B:
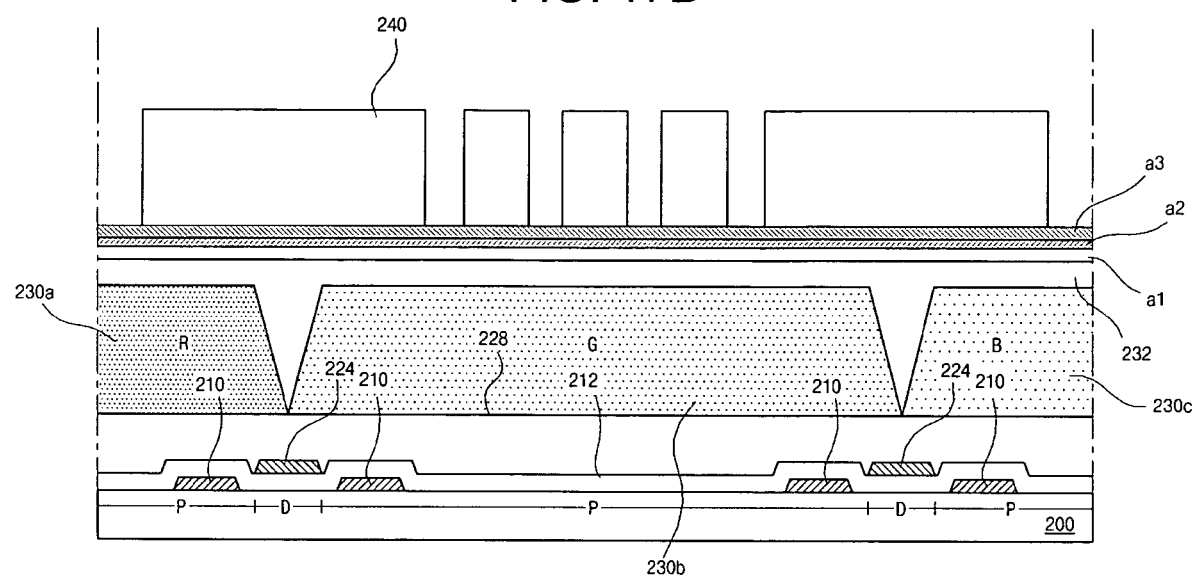
Figure 17C:
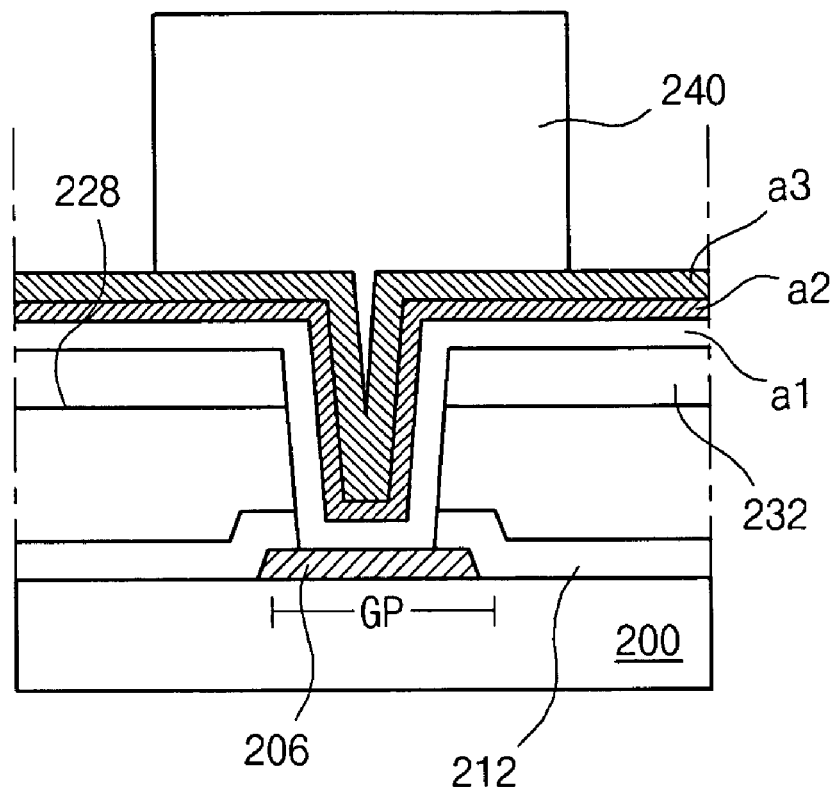
Figure 17D:
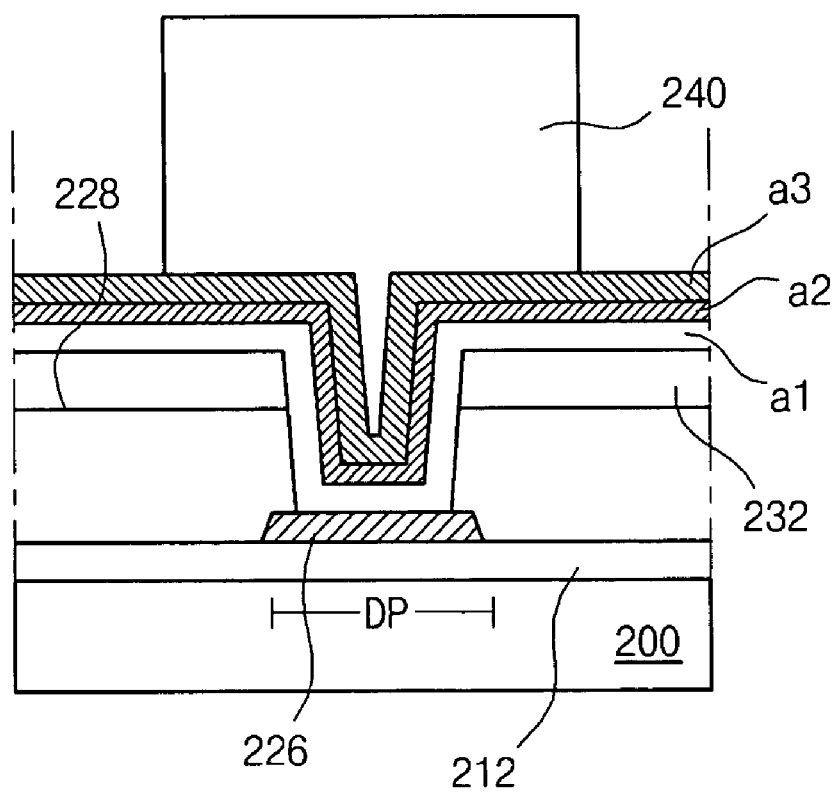
Figure 18A:
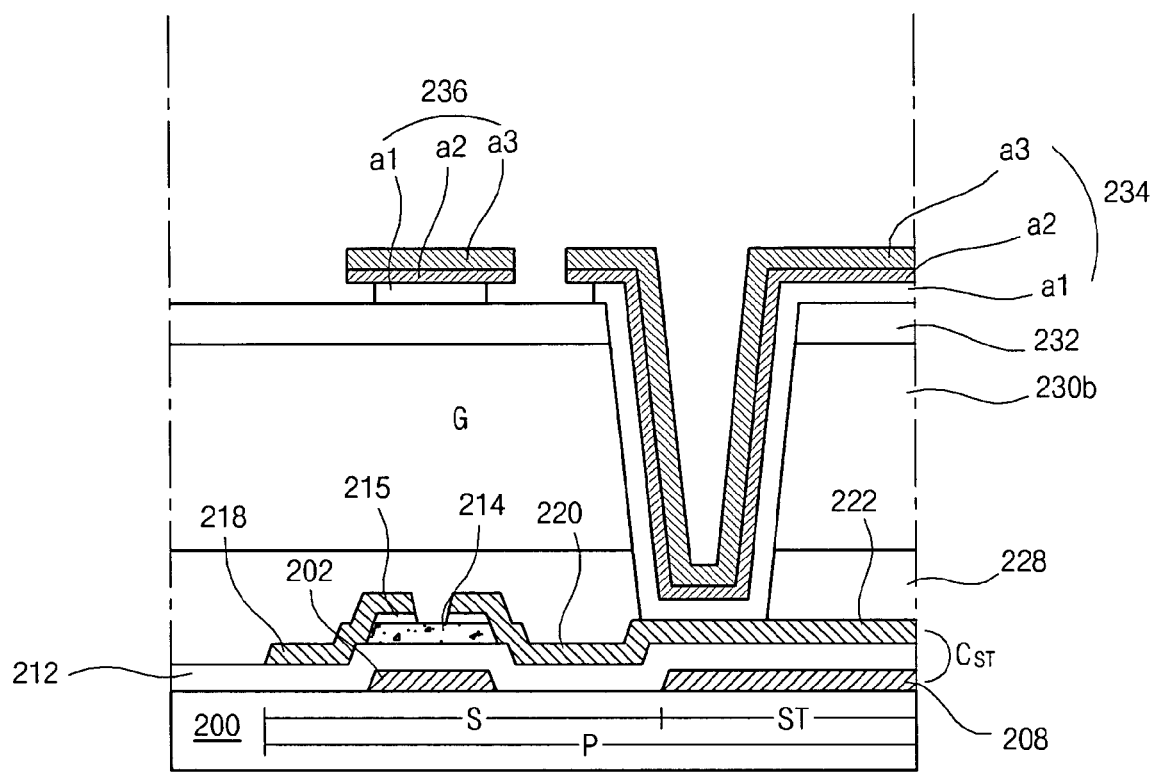
FIGS. 18A to 18D are cross-sectional views taken along lines III-III, IV-IV, V-V and VI-VI of FIG. 3, respectively, of the LCD structure formed through the sixth mask process according to the second exemplary embodiment of the present invention.
Figure 18B:
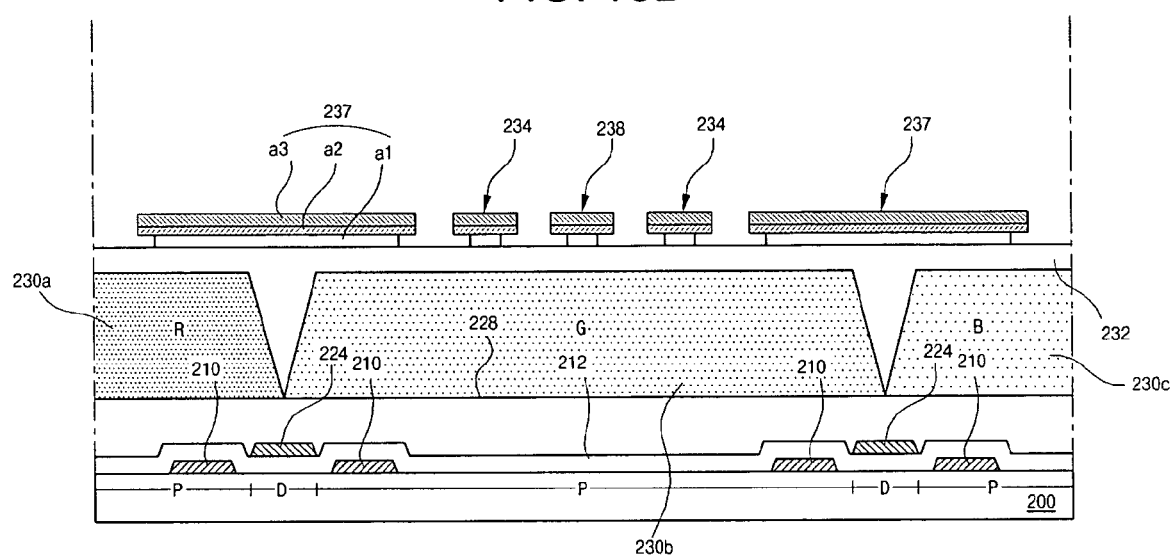
Figure 18C:
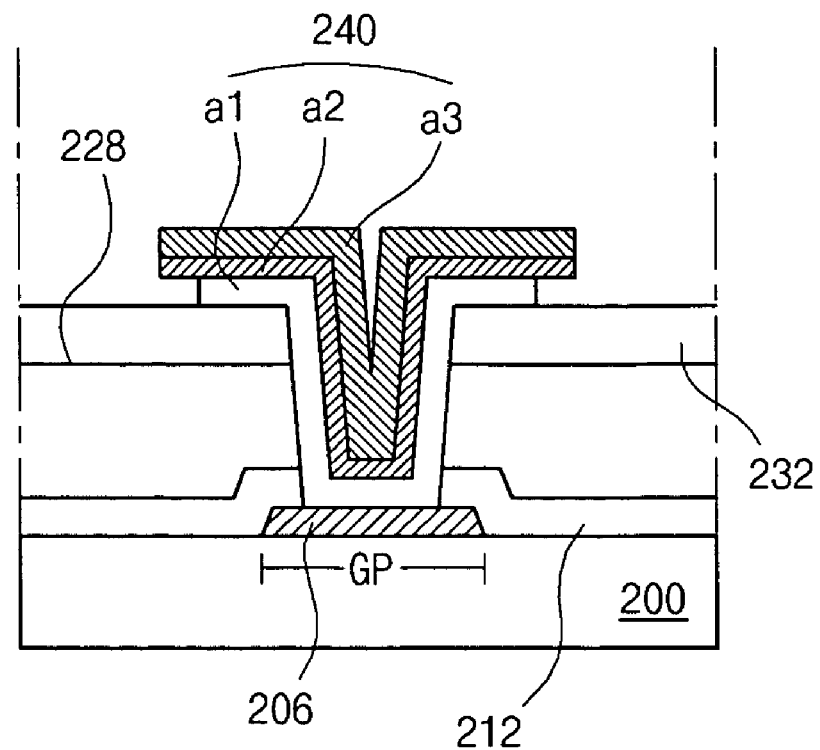
Figure 18D:
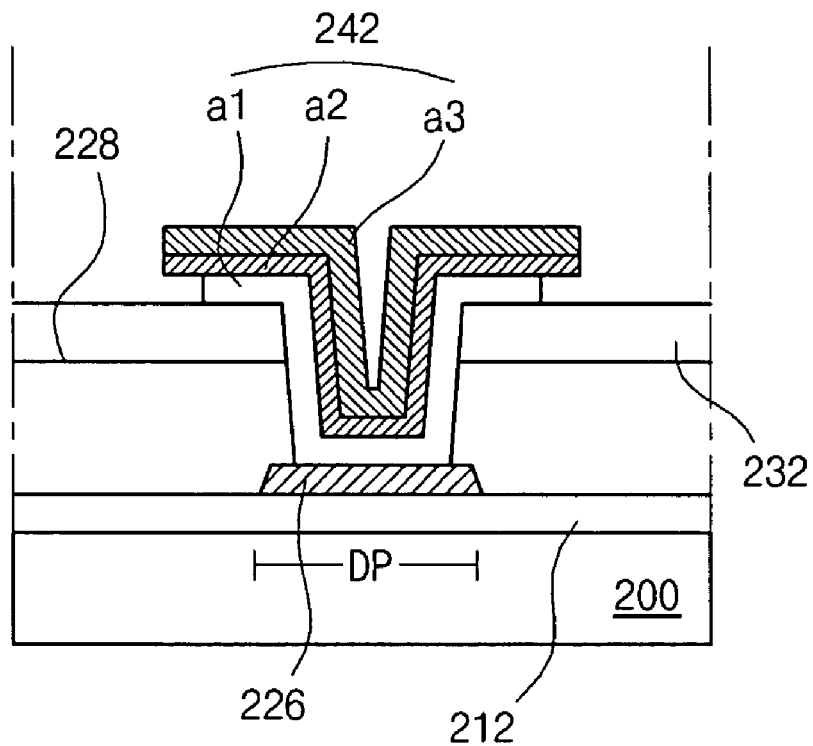
Figure 19A:
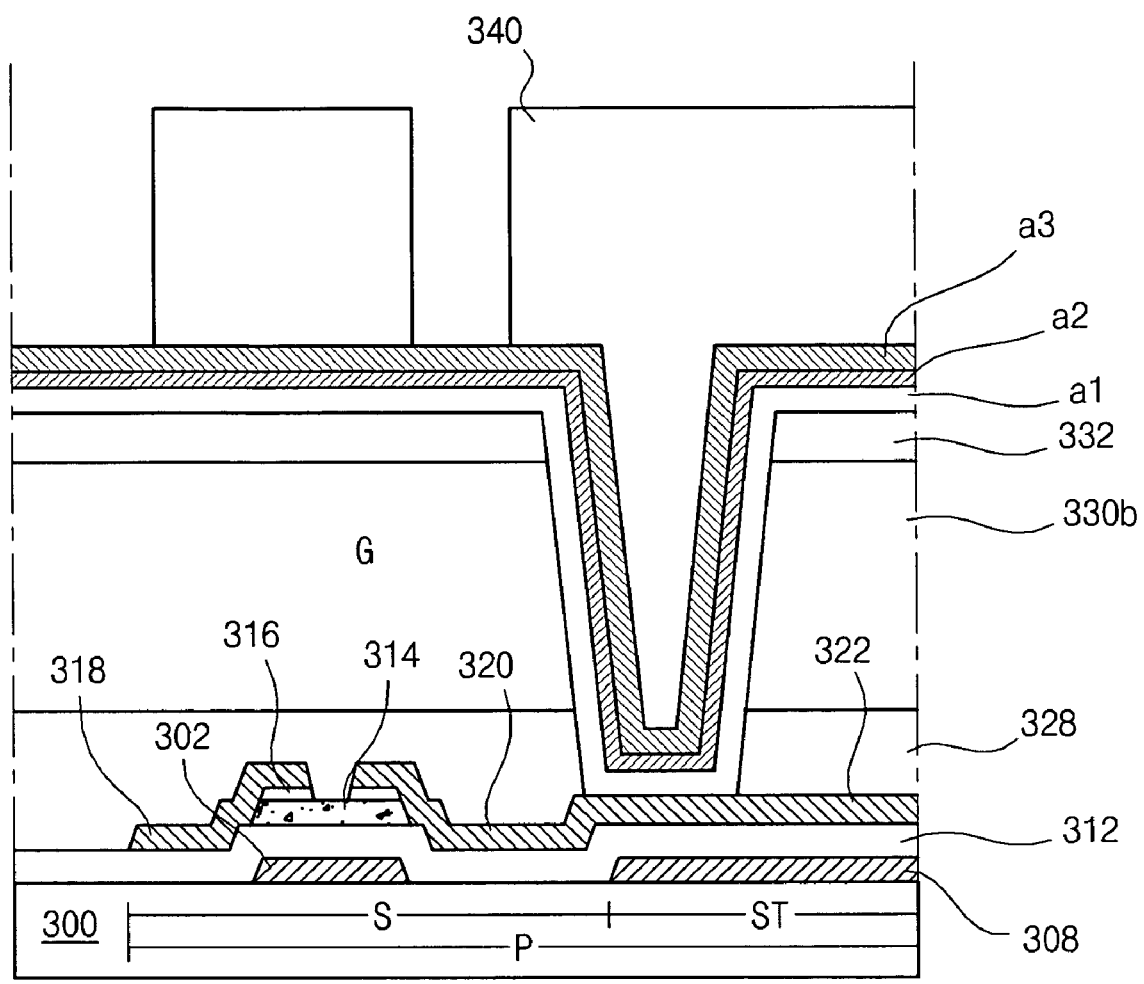
FIGS. 19A to 19D are cross-sectional views taken along lines III-III, IV-IV, V-V and VI-VI of FIG. 3, respectively, of the LCD structure having a photoresist pattern formed with a sixth mask process according to the third exemplary embodiment of the present invention.
Figure 19B:
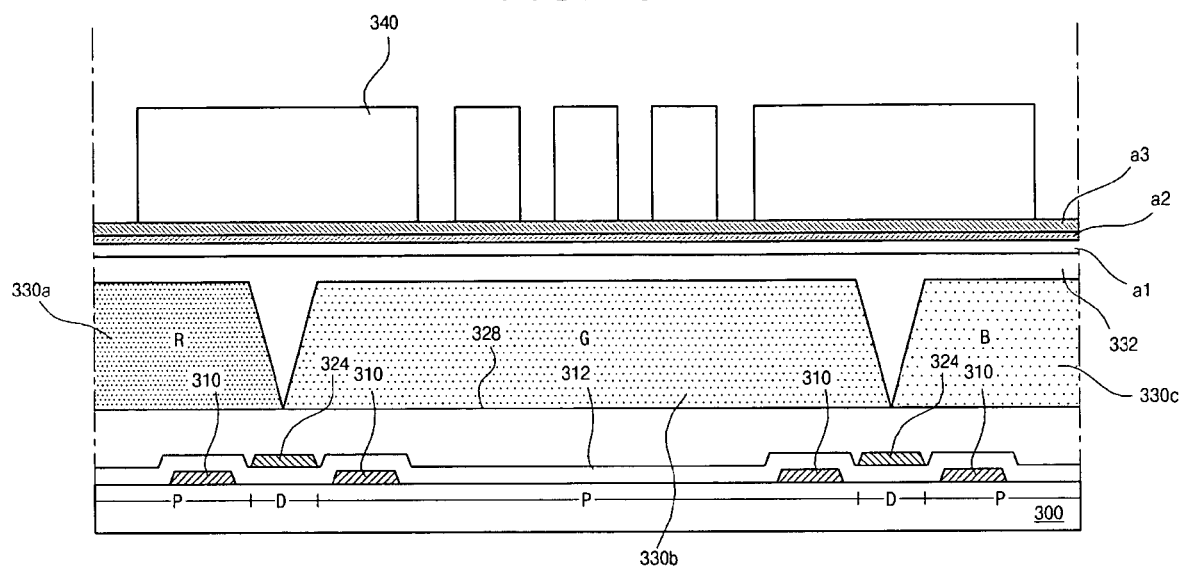
Figure 19C:
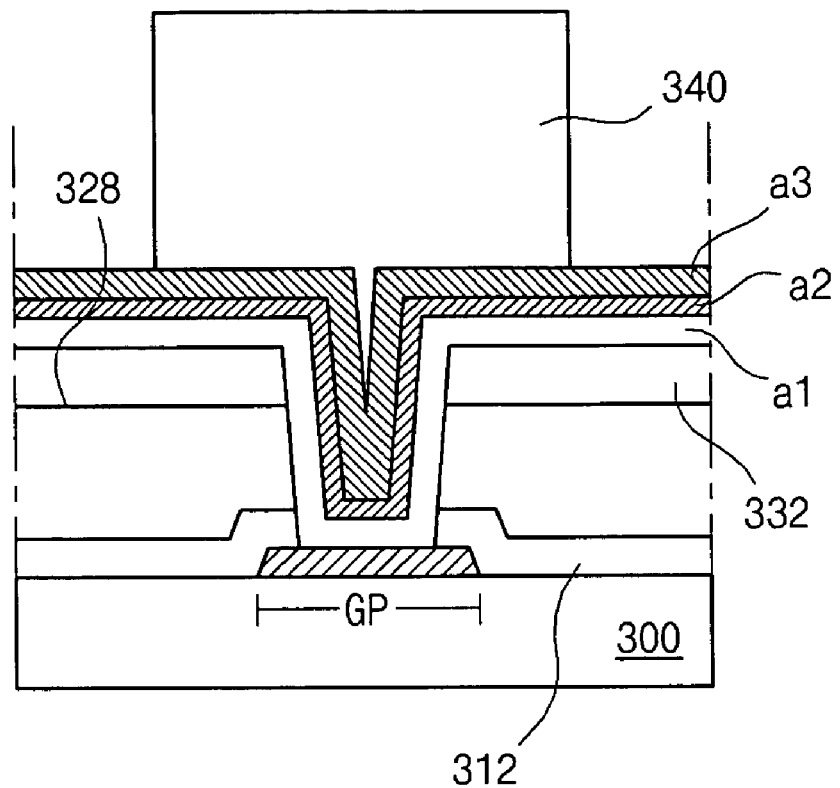
Figure 19D:
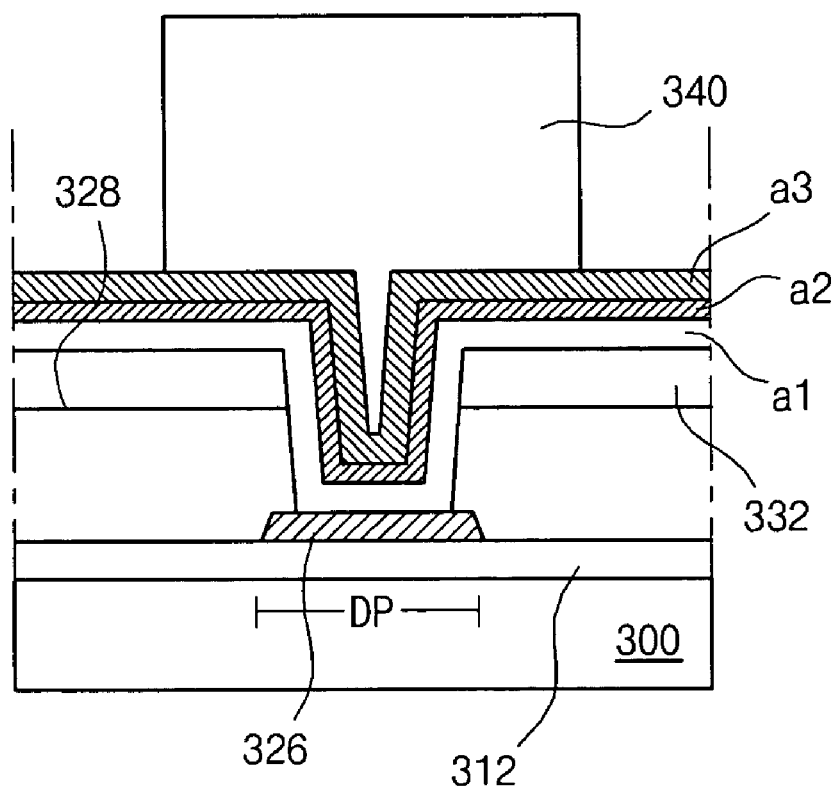
Figure 20A:
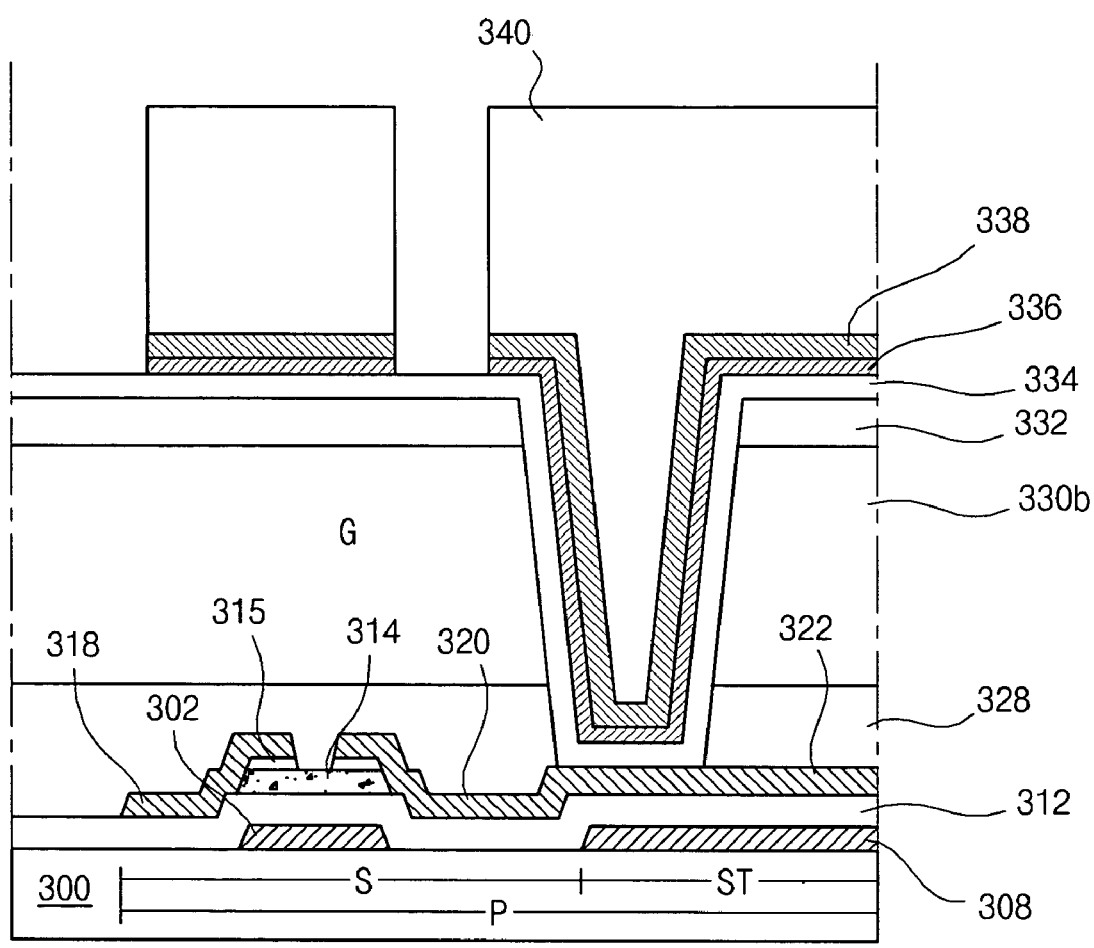
FIGS. 20A to 20D are cross-sectional views taken along lines III-III, IV-IV, V-V and VI-VI of FIG. 3, respectively, of the LCD structure having the second and third conductive layers patterned by using the photoresist pattern according to the third exemplary embodiment of the present invention.
Figure 20B:
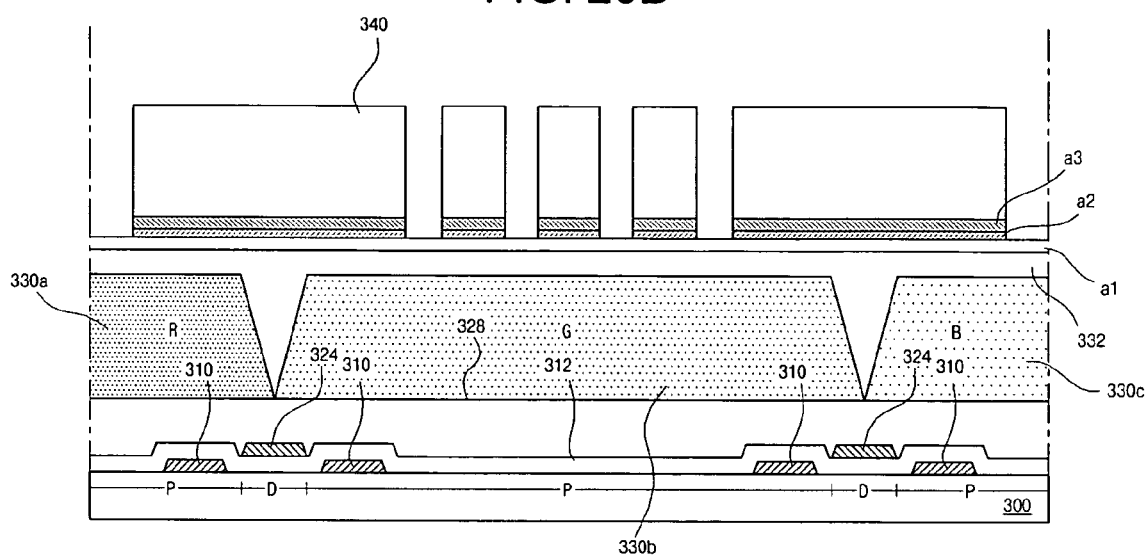
Figure 20C:
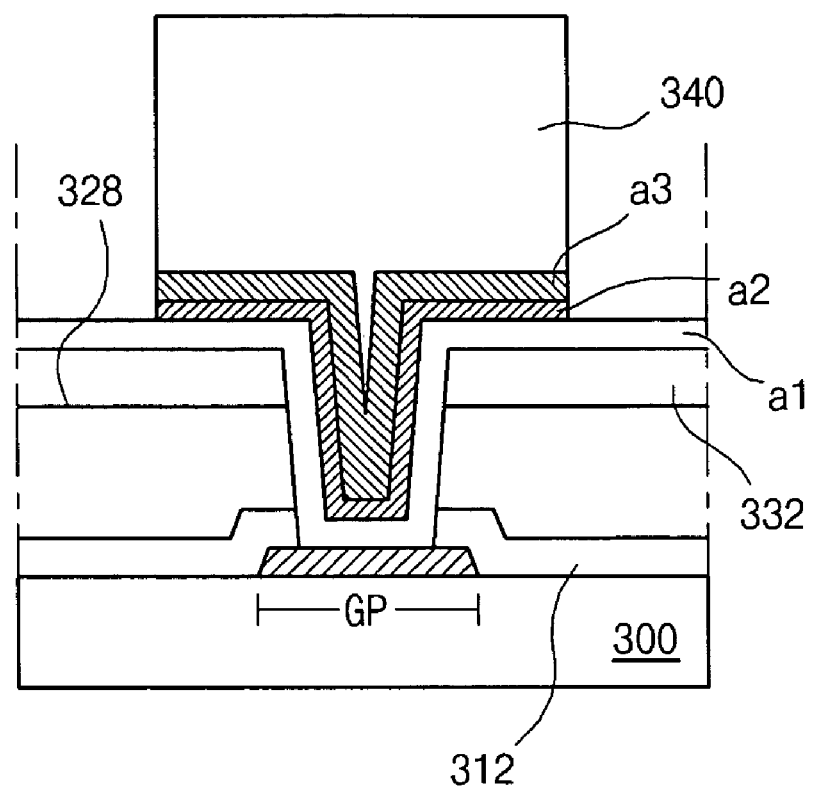
Figure 20D:
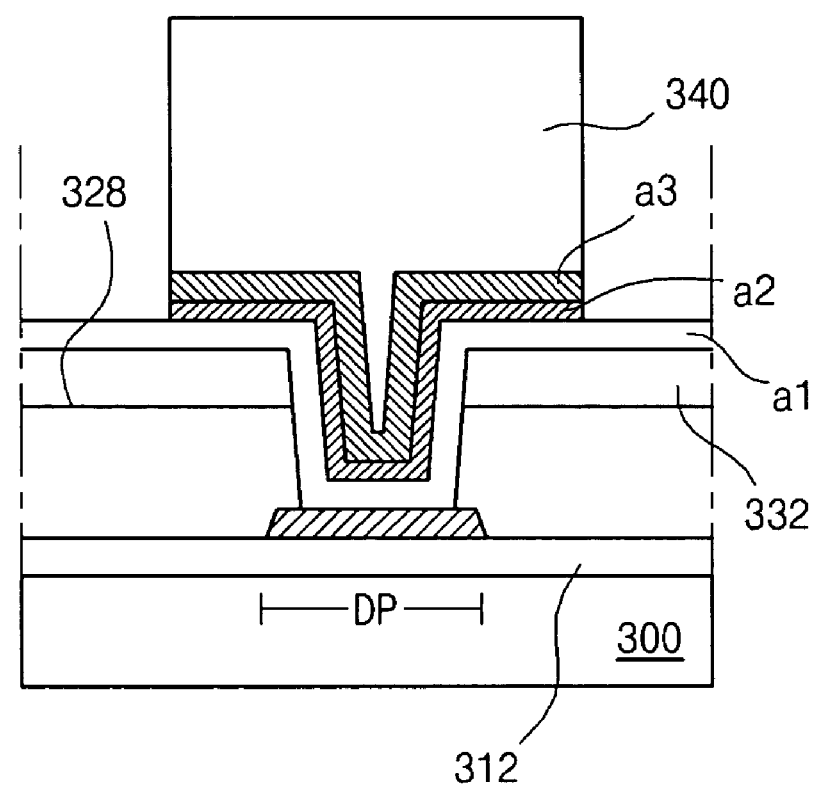
Figure 21A:
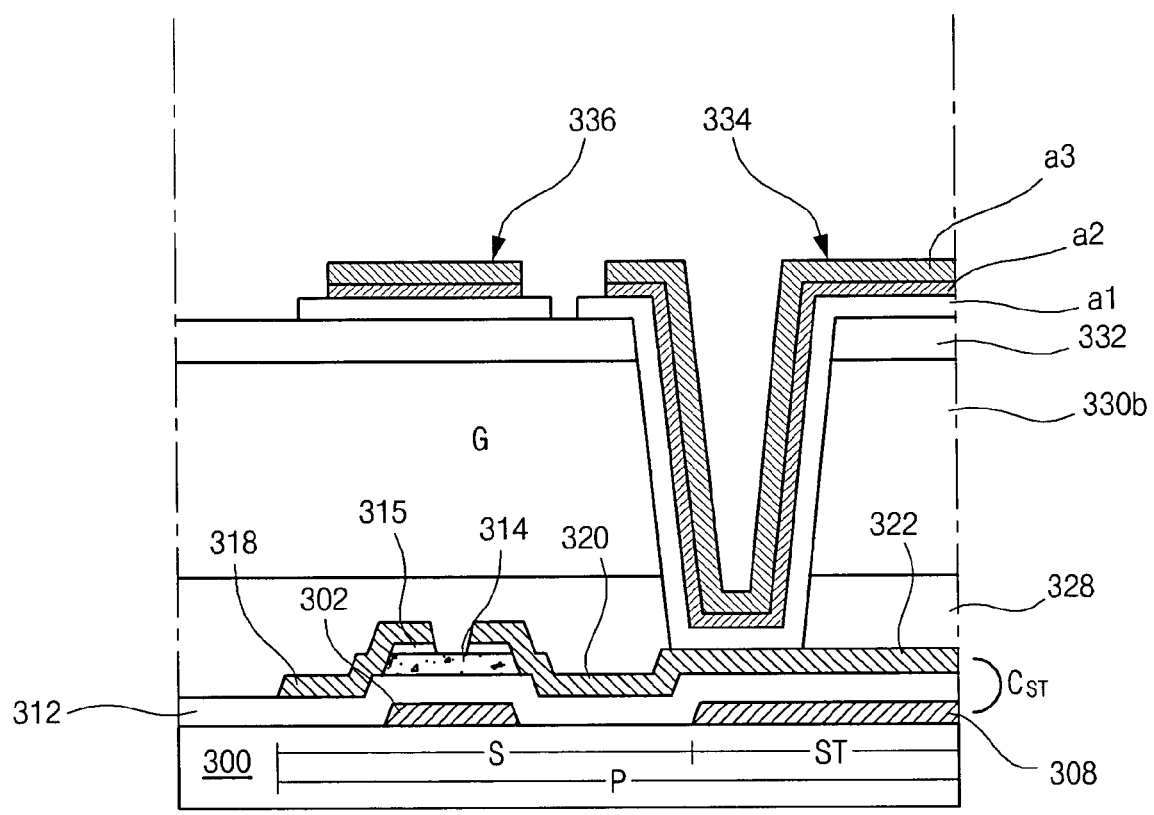
FIGS. 21A to 21D are cross-sectional views taken along lines III-III, IV-IV, V-V and VI-VI of FIG. 3, respectively, of the LCD structure having the first conductive layer patterned by using the heat-treated photoresist pattern according to the third exemplary embodiment of the present invention.
Figure 21B:
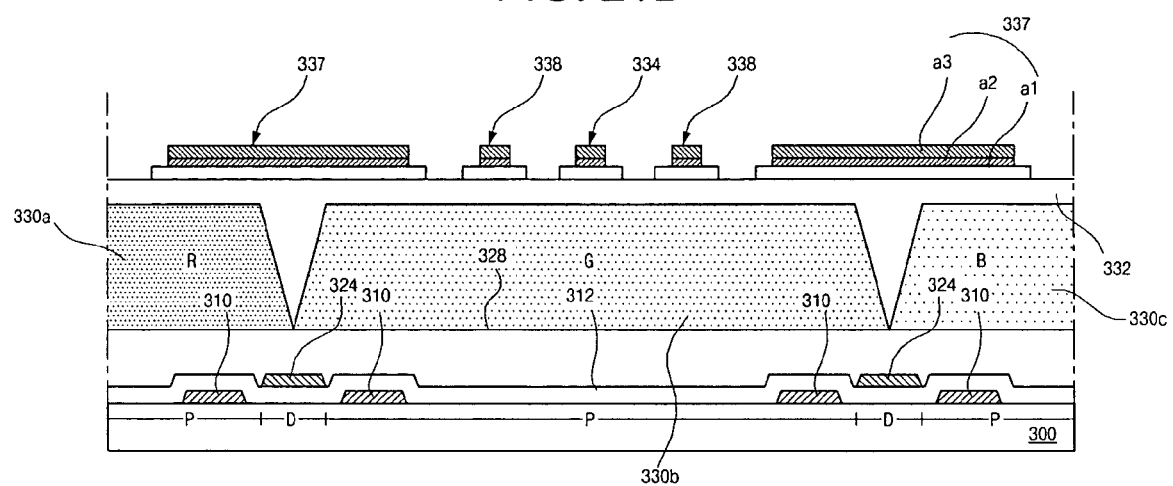
Figure 21C:
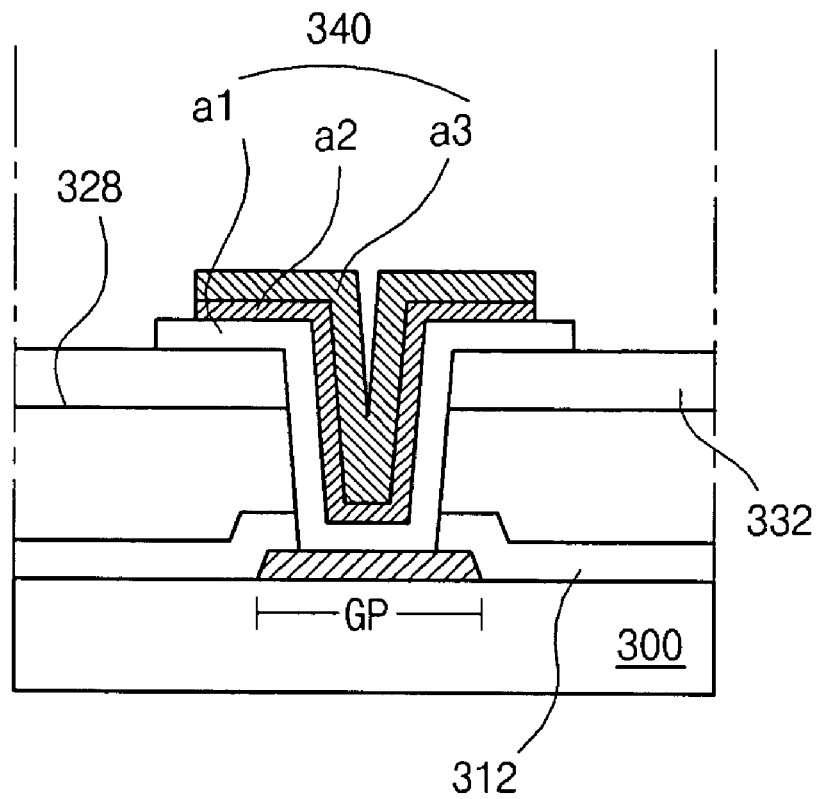
Figure 21D:
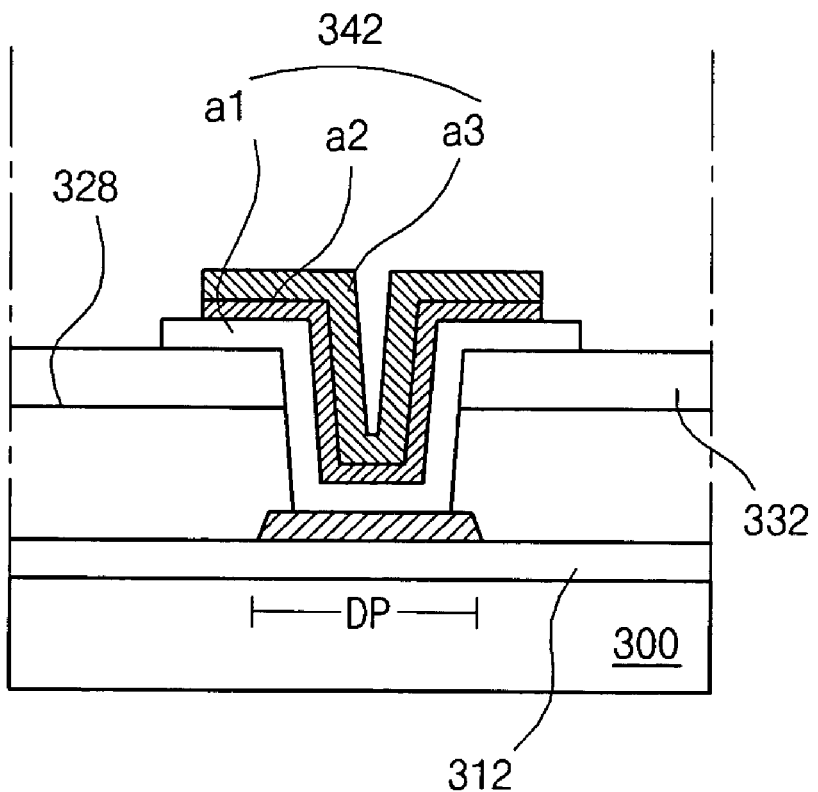

In addition, as shown in FIG. 11B, the pixel electrode 134 and the second common electrode 138 are coplanar in the pixel region to form an in-plane electric field. The pixel electrode 134 and the second common electrode 138 are formed above the color filter patterns 130a, 130b, and 130c. As shown in FIG. 1A, the second common electrode 138 is extended from a second common line 136; the second common line 136 and the pixel electrode 134 are also coplanar.

Hereinafter, a method of fabricating the substrate for the LCD device according to a second exemplary embodiment of the present invention will be explained. The substrate for the LCD of the second exemplary embodiment is similar to the substrate for the LCD of the first exemplary embodiment, except for structures and fabricating processes of the pixel electrode and the second common electrode. Accordingly, the detailed explanations of parts similar to parts of the first exemplary embodiment will not be repeated.

FIGS. 12A to 12D are cross-sectional views taken along lines III-III, IV-IV, V-V and VI-VI of FIG. 3, respectively, of first and second mask processes for forming an LCD device according to the second exemplary embodiment of the present invention. As shown in FIGS. 12A to 12D, a first metal layer is deposited on a substrate 200 having a pixel region "P", a switching region "S", a storage region "ST", a gate pad region "GP", a data pad region "DP" and a data region "D". The first metal layer is patterned with a first mask process to form a gate line 204, a gate electrode 202, a gate pad electrode 206, a first common line 208 and a first common electrode 210. A gate insulator 212 is formed on the entire surface of the substrate 200 having the gate line 204.

An intrinsic amorphous silicon (a-Si:H) and an impurity-doped amorphous silicon (n+a-Si:H) are sequentially deposited on the gate insulator 212, and are patterned with a second mask process to form a semiconductor pattern 216. The semiconductor pattern 216 includes an active layer 214 and an ohmic contact layer 215.

FIGS. 13A to 13D are cross-sectional views taken along lines III-III, IV-IV, V-V and VI-VI of FIG. 3, respectively, of a third mask process for forming an LCD device according to the second exemplary embodiment of the present invention. As shown in FIGS. 13A to 13D, a second metal is deposited on the substrate 200 having the semiconductor pattern 216. The second metal is patterned with a third mask process to form a data line 224, source and drain electrodes 218 and 220, a data pad electrode 226 and a storage electrode 222. Portions of the ohmic contact layer 215 is etched through the source and drain electrodes 218 and 220 apart from each other to expose portions of the active layer 214.

FIGS. 14A to 14D are cross-sectional views taken along lines III-III, IV-IV, V-V and VI-VI of FIG. 3, respectively, of an LCD structure having a passivation layer according to the second exemplary embodiment of the present invention. As shown in FIGS. 14A to 14D, a passivation layer 228 is formed on the entire surface of the substrate 200 having the data line 224.

FIGS. 15A to 15D are cross-sectional views taken along lines III-III, IV-IV, V-V and VI-VI of FIG. 3, respectively, of a fourth mask process for forming an LCD device according to an second exemplary embodiment of the present invention. As shown in FIGS. 15A to 15D, red (R), green (G) and blue (B) color resins are sequentially deposited, and are patterned with a fourth mask process to form red (R), green (G) and blue (B) color filter patterns 230a, 230b and 230c in respective pixel regions "P".

A planarization layer 232 is formed on the entire surface of the substrate 200 having the color filter patterns 230a, 230b and 230c. The planarization layer 232 may be made of an organic insulating material such as benzo-cyclo-butene (BCB) and/or acrylic resin.

FIGS. 16A to 16D are cross-sectional views taken along lines III-III, IV-IV, V-V and VI-VI of FIG. 3, respectively, of a fifth mask process for forming an LCD device according to the second exemplary embodiment of the present invention. As shown in FIGS. 16A to 16D, with a fifth mask process, first, second and third contact holes "CH1", "CH2" and "CH3" are formed. The first contact hole "CH1" are formed by etching the planarization layer 232, each of the color filter patterns 230a, 230b and 230c, and the passivation layer 228. Therefore, the first contact hole "CH1" exposes the storage electrode 222 in the storage region "ST". The second contact hole "CH2" is formed by etching the planarization layer 232, the passivation layer 228 and the gate insulator 212. Therefore, the second contact hole "CH2" exposes the gate pad electrode 206 in the gate pad region "GP". The third contact hole "CH3" is formed by etching the planarization layer 232 and the passivation layer 228. Therefore, the third contact hole "CH3" exposes the data pad electrode 226 in the data pad region "DP".

FIGS. 17A to 17D are cross-sectional views taken along lines III-III, IV-IV, V-V and VI-VI of FIG. 3, respectively, of a sixth mask process for forming an LCD device according to the second exemplary embodiment of the present invention. As shown in FIGS. 17A to 17D, a first conductive layer "a1", a second conductive layer "a2" and a third conductive layer "a3" are deposited sequentially on the planarization layer 232, and then a photoresist layer is deposited on the third conductive layer "a3". The first conductive layer "a1" may be made of a transparent conductive material such as indium-tin-oxide (ITO) and/or indium-zinc-oxide (IZO). The second conductive layer "a2" may be made of an opaque conductive material such as aluminum (Al), aluminum alloy (AlNd), copper (Cu), tungsten (W), chromium (Cr), molybdenum (Mo) and/or titanium (Ti). The third conductive layer "a3" may be made of a low reflective conductive material such as chromium oxide (CrOx).

The photoresist layer is patterned with a sixth mask process to form a photoresist pattern 240. The photoresist patterns 240 correspond to the gate line 204, the thin film transistor "T" (of FIG. 3), the data line 224, the first common electrode 210, the gate pad electrode 206, the data pad electrode 226 and the pixel region "P". In particular, the photoresist patterns 240 in the pixel region "P" are spaced apart form each other.

The third, second and first conductive layers "a1", "a2" and "a3" may be sequentially etched by using the photoresist pattern 240. In particular, if the second and third conductive layers "a2" and "a3" are made of chromium (Cr) and chromium oxide (CrOx), respectively, the second and third conductive layer "a2" and "a3" may be concurrently etched by the same etching solution. Then, the photoresist pattern 240 is stripped.

FIGS. 18A to 18D are cross-sectional views taken along lines III-III, IV-IV, V-V and VI-VI of FIG. 3, respectively, of the LCD structure formed through the sixth mask process according to the second exemplary embodiment of the present invention. As shown in FIGS. 18A to 18D, through the sixth mask process, the pixel electrode 234, the second common line 236, the shielding portion 237, the second common electrode 238, the gate pad electrode terminal 240 and the data pad electrode terminal 242 having the patterned first, second and third conductive layers "a1", "a2" and "a3" are formed. The patterned first, second and third conductive layers "a1", "a2" and "a3" have substantially the same plane-shape. In particular, end lines of the patterned second and third conductive layers "a2" and "a3" substantially coincide with each other.

Further, an end line of the patterned first conductive layer "a1" is disposed inside the end line of each of the patterned second and third conductive layers "a2" and "a3". Since the first conductive layer "a1" (of FIGS. 17A to 17D) is patterned by using the patterned second and third conductive layers "a2" and "a3" as an etching mask, side portions of the first conductive layer "a1" are over-etched and thus the end line of the patterned first conductive layer "a1" is disposed inside the end line of each of the patterned second and third conductive layers "a2" and "a3". In other words, the width of the patterned first conductive layer "a1" is narrower than the width of the patterned second and third conductive layers "a2" and "a3".

The fabrication method of the second exemplary embodiment requires six mask processes by two mask processes less than the fabrication method of the first exemplary embodiment. Accordingly, the production processes and costs can be further reduced.

Hereinafter, a method of forming the substrate for the LCD device according to a third exemplary embodiment of the present invention will be explained. The substrate for the LCD of the third exemplary embodiment is similar to the substrate for the LCD of the first and second exemplary embodiments, except for structures and fabricating processes of the pixel electrode and the second common electrode. Accordingly, the detailed explanations of parts similar to parts of the first and second exemplary embodiments will not be repeated. In particular, the first through sixth mask processes of the third exemplary embodiment are equal to the first through sixth mask processes of the second exemplary embodiment.

FIGS. 19A to 19D are cross-sectional views taken along lines III-III, IV-IV, V-V and VI-VI of FIG. 3, respectively, of the LCD structure having a photoresist pattern formed with a sixth mask process according to the third exemplary embodiment of the present invention. As shown in FIGS. 19A to 19D, a first conductive layer "a1", a second conductive layer "a2" and a third conductive layer "a3" are deposited sequentially on the planarization layer 332, and then a photoresist layer is deposited on the third conductive layer "a3" and patterned with a sixth mask process to form a photoresist pattern 340.

FIGS. 20A to 20D are cross-sectional views taken along lines III-III, IV-IV, V-V and VI-VI of FIG. 3, respectively, of LCD structure having the second and third conductive layers patterned by using the photoresist pattern according to the third exemplary embodiment of the present invention. As shown in FIGS. 20A to 20D, the second and third conductive layers "a2" and "a3" (of FIGS. 19A to 19D) are patterned by using the photoresist pattern 340. Then, though not shown in FIGS. 20A to 20D, the photoresist pattern 340 is heat-treated such that the heat-treated photoresist pattern covers the patterned second and third conductive layers "a2" and "a3". The first conductive layer "a1" (of FIGS. 19A to 19D) is patterned by using the heat-treated photoresist pattern. Then, the heat-treated photoresist pattern is stripped.

FIGS. 21A to 21D are cross-sectional views taken along lines III-III, IV-IV, V-V and VI-VI of FIG. 3, respectively, of the LCD structure having the first conductive layer patterned by using the heat-treated photoresist pattern according to the third exemplary embodiment of the present invention.

Through the above processes of patterning the first, second and third conductive layers "a1", "a2" and "a3" (of FIGS. 19A to 19D), the pixel electrode 334, the second common line 336, the shielding portion 337, the second common electrode 338, the gate pad electrode terminal 340 and the data pad electrode terminal 342 having the patterned first, second and third conductive layers "a1", "a2" and "a3" are formed. The patterned first, second and third conductive layers "a1", "a2" and "a3" have the same plane-shape. In particular, end lines of the patterned second and third conductive layers "a2" and "a3" coincide with each other, and an end line of the patterned first conductive layer "a1" is disposed outside the end line of each of the patterned second and third conductive layers "a2" and "a3". In other words, the width of the patterned first conductive layer "a1" is wider than the width of the patterned second and third conductive layers "a2" and "a3".

In the above explained third exemplary embodiment, the end line of the patterned first conductive layer is disposed outside the end line of each of the patterned second and third conductive layers, and the patterned first conductive layer is made of a transparent conductive material. Accordingly, the pixel electrode and the second common electrode further have transparent portions i.e., portions between the end line of the first conductive layer and the end line of each of the second and third conductive layers. Thus, aperture ratio and luminance of the LCD device can be improved.

In the second and third exemplary embodiments, the patterned second and third conductive layers of the gate and data pad electrode terminals may be removed to improve a contacting characteristic with exterior driving circuits and to reduce the resistance.

FIG. 22 is a plan view of the LCD device having the substrate fabricated according to the second and third exemplary embodiments of the present invention.

The LCD device 400 includes a first substrate 200 or 300 corresponding to the second and third exemplary embodiments, and a second substrate 500 facing the first substrate 200 or 300, and a liquid crystal material interposed between the first substrate 200 or 300 and the second substrate 500. In the LCD device 400, a display region "DR" and a non-display region "NR" at peripheral portions of the display region "DR" are defined. The pixel regions are disposed in the display region "DR", and the gate and data pad regions "GP" and "DP" are disposed in the non-display region "NR".

The first substrate 200 or 300 and the second substrate 500 are attached with a sealant (not shown). Then, portions of the second substrate 500 corresponding to the non-display region "NR" are cut off, and thus the gate and data pad regions "GP" and "DP" of the first substrate 200 or 300 are exposed. Then, the patterned second and third conductive layers of the gate and data pad electrode terminals are removed. To remove the patterned second and third conductive layers, the dipping method may be used so that the gate and data pad regions "GP" and "DP" of the LCD device are dipped into an etching solution by using the second substrate 500. The second substrate 500 may be used as the mask. Accordingly, each of the gate and data pad electrode terminals has the patterned first conductive layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display structure, comprising:
    a gate line and a data line crossing each other on a substrate to define a pixel region;
    a thin film transistor connected to the gate line and the data line;
    a color filter pattern in the pixel region; and
    a pixel electrode in the pixel region, the pixel electrode being above the color filter pattern, the pixel electrode being a first stack structure including a transparent layer, an opaque layer and a low reflective layer, wherein the low reflective layer is disposed on the opaque layer.

2. The liquid crystal display structure of claim 1, wherein the pixel electrode has a first straight portion and a second straight portion, an oblique angle being at a connection of the first straight portion and the second straight portion.

3. The liquid crystal display structure of claim 1, further comprising a first common electrode in the pixel region, the first common electrode being a second stack structure including the transparent layer, the opaque layer and the low reflective layer.

4. The liquid crystal display structure of claim 3, wherein the first common electrode is above the color filter pattern.

5. The liquid crystal display structure of claim 3, wherein the first common electrode has a first straight portion and a second straight portion, an oblique angle being at a connection of the first straight portion and the second straight portion.

6. The liquid crystal display structure of claim 3, wherein the pixel electrode and the first common electrode are coplanar to form an in-plane electric field.

7. The liquid crystal display structure of claim 3, wherein the first common electrode is extended from a first common line, the first common line and the pixel electrode being coplanar.

8. The liquid crystal display structure of claim 7, wherein the first common line is directly above the thin film transistor and the gate line.

9. The liquid crystal display structure of claim 1, further comprising:
   a second common electrode on the substrate; and
   a shielding portion, the shielding portion being above and covering an area between the data line and the second common electrode to block light through the area between the data line and the second common electrode.

10. The liquid crystal display structure of claim 9, wherein the second common electrode is extended from a second common line, the second common line and the gate line being coplanar.

11. The liquid crystal display structure of claim 10, further comprising a storage capacitor, the storage capacitor including a storage electrode extended from the thin film transistor, the storage electrode being connected to the pixel electrode, the storage electrode and the second common line being two electrodes of the storage capacitor.

12. The liquid crystal display structure of claim 1, wherein the transparent layer is at a top of the first stack structure.

13. The liquid crystal display structure of claim 1, wherein the transparent layer is at a bottom of the first stack structure.

14. The liquid crystal display structure of claim 13, wherein the transparent layer has a width narrower than a width of the opaque layer and the low reflective layer.

15. The liquid crystal display structure of claim 13, wherein the transparent layer has a width larger than a width of the opaque layer and the low reflective layer.

16. The liquid crystal display structure of claim 1, further comprising:
   a gate pad electrode and a data pad electrode at an end of the gate line and the data line, respectively; and
   a gate pad electrode terminal and a data pad electrode terminal on the gate pad electrode and the data pad electrode, respectively, each of the gate pad electrode terminal and the data pad electrode terminal having at least the transparent layer.

17. The liquid crystal display structure of claim 16, wherein each of the gate pad electrode terminal and data pad electrode terminal further has the opaque layer below the transparent layer.

18. The liquid crystal display structure of claim 1, wherein the opaque layer is made of at least one of aluminum (Al), aluminum alloy (AlNd), copper (Cu), tungsten (W), chromium (Cr), molybdenum (Mo) and titanium (Ti).

19. The liquid crystal display structure of claim 1, wherein the low reflective layer is made of chromium oxide (CrOx).

20. The liquid crystal display structure of claim 1, wherein the transparent layer is made of at least one of indium-tin-oxide (ITO) and indium-zinc-oxide (IZO).

21. A liquid crystal display device, comprising:
   a gate line and a data line crossing each other on a lower substrate to define a pixel region;
   a thin film transistor connected to the gate line and the data line;
   a color filter pattern in the pixel region;
   a pixel electrode in the pixel region, the pixel electrode being above the color filter pattern, the pixel electrode being a first stack structure including a transparent layer, an opaque layer and a low reflective layer, wherein the low reflective layer is disposed on the opaque layer;
   an upper substrate; and
   a liquid crystal material between the lower substrate and the upper substrate.

22. The liquid crystal display device of claim 21, further comprising a first common electrode in the pixel region, the first common electrode being a second stack structure including the transparent layer, the opaque layer and the low reflective layer.

23. The liquid crystal display device of claim 22, wherein the first common electrode is above the color filter pattern.

24. The liquid crystal display device of claim 22, wherein the pixel electrode and the first common electrode are coplanar to form an in-plane electric field.

25. The liquid crystal display device of claim 22, wherein the first common electrode is extended from a first common line, the first common line and the pixel electrode being coplanar.

26. The liquid crystal display device of claim 25, wherein the first common line is directly above the thin film transistor and the gate line.

27. The liquid crystal display device of claim 21, further comprising:
   a second common electrode on the lower substrate; and
   a shielding portion, the shielding portion being above and covering an area between the data line and the second common electrode to block light through the area between the data line and the second common electrode.

28. The liquid crystal display device of claim 27, wherein the second common electrode is extended from a second common line, the second common line and the gate line being coplanar.

29. The liquid crystal display device of claim 28, further comprising a storage capacitor, the storage capacitor including a storage electrode extended from the thin film transistor, the storage electrode being connected to the pixel electrode, the storage electrode and the second common line being two electrodes of the storage capacitor.

30. The liquid crystal display device of claim 21, wherein the transparent layer is at a top of the first stack structure.

31. The liquid crystal display device of claim 21, wherein the transparent layer is at a bottom of the first stack structure.

32. The liquid crystal display device of claim 31, wherein the transparent layer has a width narrower than a width of the opaque layer and the low reflective layer.

33. The liquid crystal display device of claim 31, wherein the transparent layer has a width larger than a width of the opaque layer and the low reflective layer.

34. A method of fabricating a liquid crystal display structure, comprising the steps of:
   forming a thin film transistor on a substrate;
   defining a pixel region adjacent to the thin film transistor by forming a gate line and a data line crossing each other;
   forming a color filter pattern in the pixel region; and
   forming a pixel electrode in the pixel region by forming a transparent layer, an opaque layer and a low reflective layer above the color filter pattern, wherein the low reflective layer is disposed on the opaque layer.

35. The method of claim 34, wherein the step of forming the pixel electrode further includes forming a first straight portion and a second straight portion of the pixel electrode with an oblique angle at a connection of the first straight portion and the second straight portion.

36. The method of claim 34, further comprising forming a first common electrode in the pixel region by forming the transparent layer, the opaque layer and the low reflective layer above the color filter pattern.

37. The method of claim 36, wherein the step of forming the first common electrode further includes forming a first straight portion and a second straight portion of the first common electrode with an oblique angle at a connection of the first straight portion and the second straight portion.

38. The method of claim 36, wherein the step of forming the pixel electrode and the first common electrode further includes forming the pixel electrode and the first common electrode in a same plane.

39. The method of claim 38, further comprising: forming a first common line in the same plane to be connected to the first common electrode.

40. The method of claim 39, wherein the step of forming the first common line includes forming the first common line directly above the thin film transistor and the gate line.

41. The method of claim 34, further comprising:
forming a second common electrode on the substrate; and
forming a shielding portion above and covering an area between the data line and the second common electrode to block light through the area between the data line and the second common electrode.

42. The method of claim 41, further comprising forming a second common line coplanar with the gate line and connected to the second common electrode.

43. The method of claim 42, further comprising: forming a storage capacitor by forming a storage electrode extended from the thin film transistor and connected to the pixel electrode, the storage electrode and the second common line being two electrodes of the storage capacitor.

44. The method of claim 34, wherein the step of forming the pixel electrode and a first common electrode includes forming the transparent layer above the opaque layer and the low reflective layer.

45. The method of claim 34, wherein the step of forming the pixel electrode and a first common electrode includes forming the opaque layer and the low reflective layer above the transparent layer.

46. The method of claim 45, wherein the step of forming the pixel electrode and a first common electrode further includes over-etching a side wall of the transparent layer to form the transparent layer having a width narrower than a width of the opaque layer and the low reflective layer.

47. The method of claim 45, wherein the step of forming the pixel electrode and a first common electrode further includes:
patterning the opaque layer and the low reflective layer to expose the transparent layer;
patterning the exposed transparent layer to form the transparent layer having a width larger than a width of the opaque layer and the low reflective layer.

48. The method of claim 34, further comprising:
forming a gate pad electrode at an end of the gate line;
forming a gate pad electrode terminal by forming at least the transparent layer on the gate pad electrode;
forming a data pad electrode at an end of the data line; and
forming a data pad electrode terminal by forming at least the transparent layer on the data pad electrode.

49. The method of claim 48, further comprising:
forming the opaque layer on the gate pad electrode before the step of forming the transparent layer on the gate pad electrode; and
forming the opaque layer on the data pad electrode before the step of forming the transparent layer on the data pad electrode.

50. The method of claim 34, further comprising:
forming a gate pad electrode at an end of the gate line;
forming a data pad electrode at an end of the data line; and
forming a gate pad electrode terminal and a data pad electrode terminal by forming the transparent layer, the opaque layer and the low reflective layer on the gate pad electrode and the data pad electrode, respectively, the step of forming the gate pad electrode terminal and the data pad electrode terminal being performed simultaneously with the step of forming the pixel electrode and the first common electrode.

51. The method of claim 50, further comprising:
disposing an upper substrate on the substrate to expose the gate pad electrode terminal and the data pad electrode terminal; and
removing the opaque layer and the low reflective layer of the gate pad electrode terminal and the data pad electrode terminal by using the upper substrate as a mask.

* * * * *